US008733993B2

(12) United States Patent
Takahashi et al.

(10) Patent No.: US 8,733,993 B2
(45) Date of Patent: May 27, 2014

(54) LIGHT EMITTING DEVICE, ILLUMINATION DEVICE, VEHICLE HEADLAMP, AND VEHICLE

(75) Inventors: Koji Takahashi, Osaka (JP); Yoshiyuki Takahira, Osaka (JP); David Montgomery, Oxford (GB); James Suckling, Oxford (GB)

(73) Assignee: Sharp Kabushiki Kaisha, Osaka-shi (JP)

( * ) Notice: Subject to any disclaimer, the term of this patent is extended or adjusted under 35 U.S.C. 154(b) by 186 days.

(21) Appl. No.: 13/284,523

(22) Filed: Oct. 28, 2011

(65) Prior Publication Data

US 2012/0106188 A1 May 3, 2012

(30) Foreign Application Priority Data

Oct. 29, 2010 (JP) ................................ 2010-244569
Sep. 8, 2011 (JP) ................................ 2011-196547

(51) Int. Cl.

*B60Q 1/04* (2006.01)
*F21V 13/08* (2006.01)
*F21V 9/16* (2006.01)

(52) U.S. Cl.

USPC .............................. 362/538; 362/84; 362/516

(58) Field of Classification Search

USPC ............... 362/84, 538, 516, 539, 249.02, 545
See application file for complete search history.

(56) References Cited

U.S. PATENT DOCUMENTS

| | | | | |
|---|---|---|---|---|
| 5,535,230 | A | 7/1996 | Abe | |
| 5,962,971 | A | 10/1999 | Chen | |
| 6,412,971 | B1 | 7/2002 | Wojnarowski et al. | |
| 7,131,759 | B2 | 11/2006 | Ishida et al. | |
| 7,144,131 | B2 | 12/2006 | Rains | |
| 7,165,871 | B2 * | 1/2007 | Takeda et al. | 362/538 |
| 7,168,837 | B2 | 1/2007 | Ishida et al. | |
| 7,232,247 | B2 * | 6/2007 | Yatsuda et al. | 362/545 |
| 7,282,748 | B2 | 10/2007 | Takeda et al. | |
| 7,382,091 | B2 | 6/2008 | Chen et al. | |
| 7,810,954 | B2 | 10/2010 | Kolodin | |

(Continued)

FOREIGN PATENT DOCUMENTS

| | | |
|---|---|---|
| CN | 1676986 | 10/2005 |
| CN | 101629689 | 1/2010 |

(Continued)

OTHER PUBLICATIONS

Takahashi, K., et al. "'Laser Headlight' for Next Generation Automotive Lighting," Proceedings for the 9$^{th}$ International Symposium on Automotive Lighting. Darmstadt, Germany. Sep. 26-28, 2011. pp. 271-283 with cover page.

(Continued)

*Primary Examiner* — Stephen F Husar
*Assistant Examiner* — James Cranson, Jr.
(74) *Attorney, Agent, or Firm* — Morrison & Foerster LLP

(57) ABSTRACT

A headlamp of an embodiment of this invention includes a laser element, a light emitting section, and a parabolic mirror. A part of the parabolic mirror is provided so as to face an upper surface of the light emitting section, which upper surface has a larger area than that of a side surface of the light emitting section. The light emitting section emits fluorescence in such a manner that distribution of the fluorescence corresponds to the Lambertian distribution.

19 Claims, 22 Drawing Sheets

(56) References Cited

U.S. PATENT DOCUMENTS

| | | | |
|---|---|---|---|
| 8,342,720 B2 | 1/2013 | Harada et al. | |
| 8,348,458 B2 | 1/2013 | Holten et al. | |
| 2002/0015308 A1 | 2/2002 | Naganawa et al. | |
| 2004/0184279 A1 | 9/2004 | Molto et al. | |
| 2005/0105301 A1 | 5/2005 | Takeda et al. | |
| 2005/0157508 A1 | 7/2005 | Takeda et al. | |
| 2005/0231971 A1 | 10/2005 | Ishida | |
| 2006/0139926 A1 | 6/2006 | Morioka et al. | |
| 2007/0080362 A1 | 4/2007 | Scotch et al. | |
| 2008/0007961 A1 | 1/2008 | Mochizuki et al. | |
| 2009/0046474 A1 | 2/2009 | Sato et al. | |
| 2009/0231874 A1 | 9/2009 | Kishimoto et al. | |
| 2010/0008099 A1 | 1/2010 | Inoue et al. | |
| 2010/0102199 A1 | 4/2010 | Negley et al. | |
| 2010/0128463 A1 | 5/2010 | Kim et al. | |
| 2010/0232173 A1 | 9/2010 | Ohno et al. | |
| 2011/0215701 A1 | 9/2011 | Tong et al. | |
| 2011/0248624 A1 | 10/2011 | Kishimoto et al. | |
| 2011/0280031 A1 | 11/2011 | Luger et al. | |
| 2012/0068630 A1 | 3/2012 | Li et al. | |
| 2012/0104934 A1 | 5/2012 | Fukai et al. | |
| 2012/0106183 A1 | 5/2012 | Takahashi | |
| 2012/0106189 A1* | 5/2012 | Takahashi et al. | 362/538 |
| 2012/0140504 A1 | 6/2012 | Fukai et al. | |
| 2012/0224384 A1 | 9/2012 | Takahira et al. | |
| 2013/0003403 A1 | 1/2013 | Takahira et al. | |

FOREIGN PATENT DOCUMENTS

| | | |
|---|---|---|
| JP | 7-282609 | 10/1995 |
| JP | 7-318998 | 12/1995 |
| JP | 2002-87153 | 3/2002 |
| JP | 2003-295319 | 10/2003 |
| JP | 2004-231179 | 8/2004 |
| JP | 2004-241142 | 8/2004 |
| JP | 2005-150041 | 6/2005 |
| JP | 2005-205195 | 8/2005 |
| JP | 2006-210887 | 8/2006 |
| JP | 2006-253019 | 9/2006 |
| JP | 2007-30570 | 2/2007 |
| JP | 2007-142173 | 6/2007 |
| JP | 2008-13014 | 1/2008 |
| JP | 2009-9898 | 1/2009 |
| JP | 2009-48786 | 3/2009 |
| JP | 2009-513003 | 3/2009 |
| JP | 2009-67083 | 4/2009 |
| JP | 2009-96250 | 5/2009 |
| JP | 2009-129683 | 6/2009 |
| JP | 2009-266437 | 11/2009 |
| JP | 2009-302186 | 12/2009 |
| JP | 2010-86815 | 4/2010 |
| JP | 2010-140663 | 6/2010 |
| JP | 2010-153241 | 7/2010 |
| JP | 2010-212148 | 9/2010 |
| JP | 2010-212615 | 9/2010 |
| JP | 2010-232044 | 10/2010 |
| WO | WO-2010/116305 | 10/2010 |

OTHER PUBLICATIONS

U.S. Appl. No. 13/280,572, filed Oct. 25, 2011.

U.S. Appl. No. 13/284,487, filed Oct. 28, 2011.

Takahashi et al., U.S. Office Action mailed Jun. 11, 2013, directed to U.S. Appl. No. 13/284,487; 13 pages.

Takahashi et al., U.S. Notice of Allowance mailed Nov. 20, 2013, directed to U.S. Appl. No. 13/284,487; 13 pages.

Fukai et al., U.S. Office Action mailed Feb. 10, 2014, directed to U.S. Appl. No. 13/297,008; 12 pages.

Takahashi, U.S. Notice of Allowance mailed Feb. 21, 2014, directed to U.S. Appl. No. 13/280,572; 10 pages.

* cited by examiner

FIG. 3 (a) TOP VIEW
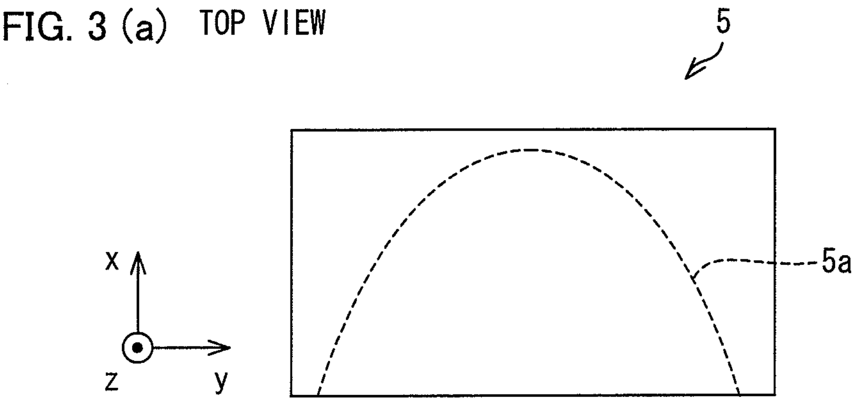
FIG. 3 (b) FRONT VIEW
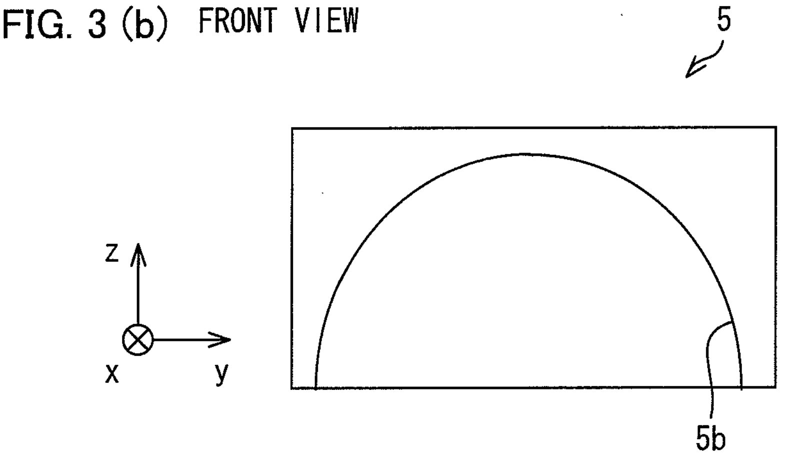
FIG. 3 (c) SIDE VIEW
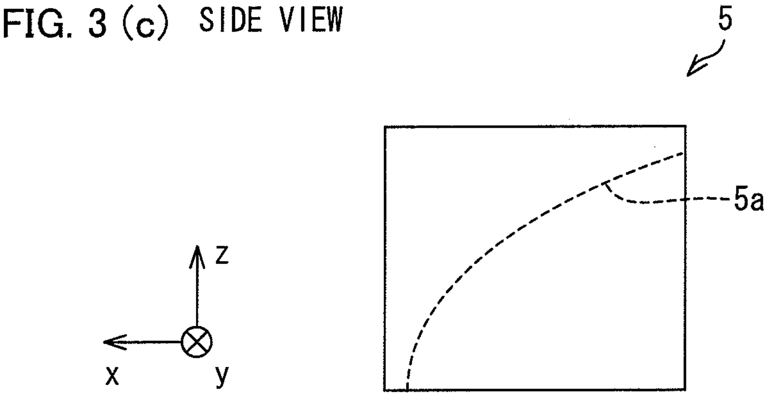

LIGHT EMITTING DEVICE, ILLUMINATION DEVICE, VEHICLE HEADLAMP, AND VEHICLE

This Nonprovisional application claims priority under 35 U.S.C. §119(a) on Patent Application No. 2010-244569 filed in Japan on Oct. 29, 2010 and Patent Application No. 2011-196547 filed in Japan on Sep. 8, 2011, the entire contents of which are hereby incorporated by reference.

TECHNICAL FIELD

The present invention relates to (i) a light emitting device for emitting, as illumination light, fluorescence that a fluorescent material generates in response to excitation light emitted thereonto, (ii) an illumination device including the light emitting device, (iii) a vehicle headlamp (headlight) including the light emitting device, and (iv) a vehicle including the vehicle headlamp.

BACKGROUND ART

In recent years, a lot of research has been done for a light emitting device which emits, as illumination light, fluorescence that a light emitting section including a fluorescent material generates in response to excitation light emitted onto the light emitting section by an excitation light source such as a semiconductor light emitting element, e.g., a light emitting diode (LED) or a semiconductor laser (LD: Laser Diode).

Examples of such a light emitting device encompass a vehicle headlamp disclosed in Patent Literature 1. The vehicle headlamp includes an LED module or an LD module as an excitation light source, and generates white light by emitting excitation light onto a fluorescent material formed into small dots each having a diameter of approximately 0.5 mm or less. The white light thus generated is reflected forward by a reflector having an elliptic spherical surface or a paraboloidal surface, so that the white light is incident on a projector lens.

CITATION LIST

Patent Literature 1

Japanese Patent Application Publication, Tokukai, No. 2004-241142 A (Publication Date: Aug. 26, 2004)

SUMMARY OF INVENTION

Technical Problem

From a viewpoint of energy saving and extension of a light-emitting duration of a light emitting device which emits light by use of a battery, it is important to reduce electric power consumption of the light emitting device. Considered as one of measures to reduce the electric power consumption of the light emitting device is, for example, to increase use efficiency of fluorescence generated by the light emitting section.

However, Patent Literature 1 neither discloses nor suggests a configuration for increasing the use efficiency.

An object of the present invention is to provide (i) a light emitting device which is capable of increasing use efficiency of fluorescence, (ii) an illumination device including the light emitting device, (iii) a vehicle headlamp including the light emitting device, and (iv) a vehicle including the vehicle headlamp.

Solution to Problem

In order to attain the foregoing object, a light emitting device in accordance with an embodiment of the present invention includes: an excitation light source for emitting excitation light; a light emitting section for emitting fluorescence upon receiving the excitation light emitted from the excitation light source; and a light projecting section for projecting, along a predetermined light projection direction, the fluorescence emitted by the light emitting section, a part of the light projecting section being provided so as to face a main light emitting surface of the light emitting section, the main light emitting surface having a larger area than that of a side surface of the light emitting section, and the light emitting section emitting the fluorescence in such a manner that distribution of the fluorescence corresponds to Lambertian distribution.

According to the above configuration, the light emitting section generates fluorescence upon receiving excitation light emitted from the excitation light source, and the light projecting section projects the fluorescence along the predetermined light projection direction, so that the fluorescence is emitted from the light emitting device as illumination light.

Here, the main light emitting surface of the light emitting section faces a part of the light projecting section. Note that the main light emitting surface has a larger area than that of the side surface of the light emitting section, and most of the fluorescence is emitted via the main light emitting surface. Therefore, it is possible to increase a percentage of fluorescence whose traveling path is controllable by the light projecting section, with respect to the fluorescence emitted from the light emitting section.

Even with this configuration, it is highly possible that (i) a traveling path of fluorescence emitted from the side surface of the fluorescent material (laterally-emitted fluorescence) cannot be controlled by the light projecting section and (ii) such fluorescence might be emitted in a direction other than the predetermined light projection direction.

However, according to the above configuration, the light emitting section emits the fluorescence in such a manner that distribution of the fluorescence corresponds to the Lambertian distribution, and therefore an amount of the laterally-emitted fluorescence is reduced.

Therefore, according to the above configuration, it is possible to reduce an amount of fluorescence that cannot be controlled by the light projecting section, thereby increasing use efficiency of fluorescence.

In order to attain the foregoing object, a light emitting device of the present invention includes: an excitation light source for emitting excitation light; a light emitting section for emitting fluorescence upon receiving the excitation light emitted from the excitation light source; and a light projecting section for projecting, along a predetermined light projection direction, the fluorescence emitted by the light emitting section, a part of the light projecting section being provided so as to face a main light emitting surface of the light emitting section, the main light emitting surface having a larger area than that of a side surface of the light emitting section, and the light emitting section having a small thickness, or a spot of the excitation light incident on a surface of the light emitting section having a smaller area than that of the surface.

According to the above configuration, the light emitting section generates fluorescence upon receiving excitation light emitted from the excitation light source, and the light projecting section projects the fluorescence along the predetermined light projection direction, so that the fluorescence is emitted from the light emitting device as illumination light.

Here, the main light emitting surface of the light emitting section faces a part of the light projecting section. Note that the main light emitting surface has a larger area than that of the side surface of the light emitting section, and most of the fluorescence is emitted via the main light emitting surface. Therefore, it is possible to increase a percentage of fluorescence whose traveling path is controllable by the light projecting section, with respect to the fluorescence emitted from the light emitting section.

Even with this configuration, it is highly possible that (i) a traveling path of fluorescence emitted from the side surface of the fluorescent material (laterally-emitted fluorescence) cannot be controlled by the light projecting section and (ii) such fluorescence might be emitted in a direction other than the predetermined light projection direction.

However, according to the above configuration, the light emitting section has a small thickness or the surface of the light emitting section which surface receives the excitation light has a larger area than an area of a spot of the excitation light. Therefore, an amount of the laterally-emitted fluorescence is reduced. This has been confirmed by the inventors of the present invention.

Therefore, according to the above configuration, it is possible to reduce an amount of fluorescence that cannot be controlled by the light projecting section, thereby increasing use efficiency of fluorescence.

Note that the description that "the light emitting section has a small thickness" herein means a shape of such a light emitting section that a side surface has a sufficiently smaller area than that of a main light emitting surface and therefore most of the fluorescence is emitted upwardly.

A vehicle of the present invention includes a vehicle headlamp, the vehicle headlamp including: an excitation light source for emitting excitation light; a light emitting section for emitting fluorescence upon receiving the excitation light emitted from the excitation light source; a reflecting mirror having a reflecting curved surface for reflecting, toward a front of the vehicle, the fluorescence emitted by the light emitting section; and a supporting member having a surface (i) facing the reflecting curved surface and (ii) supporting the light emitting section, a part of the reflecting mirror being provided so as to face a main light emitting surface of the light emitting section, the main light emitting surface having a larger area than that of a side surface of the light emitting section, the light emitting section emitting the fluorescence in such a manner that distribution of the fluorescence corresponds to Lambertian distribution, and the vehicle headlamp being mounted in the vehicle so that the reflecting curved surface is located on a lower side in a vertical direction.

A vehicle of the present invention includes a vehicle headlamp, the vehicle headlamp including: an excitation light source for emitting excitation light; a light emitting section for emitting fluorescence upon receiving the excitation light emitted from the excitation light source; a reflecting mirror having a reflecting curved surface for reflecting, toward a front of the vehicle, the fluorescence emitted by the light emitting section; and a supporting member having a surface (i) facing the reflecting curved surface and (ii) supporting the light emitting section, a part of the reflecting mirror being provided so as to face a main light emitting surface of the light emitting section, the main light emitting surface having a larger area than that of a side surface of the light emitting section, the light emitting section having a small thickness, or a spot of the excitation light incident on a surface of the light emitting section having a smaller area than that of the surface, and the vehicle headlamp being mounted in the vehicle so that the reflecting curved surface is located on a lower side in a vertical direction.

In a state where the vehicle headlamp is mounted in the vehicle, a lower part (viewed in the vertical direction) of the vehicle headlamp corresponds to the reflecting mirror having the reflecting curved surface, and an upper part (viewed in the vertical direction) of the vehicle headlamp corresponds to the supporting member. Therefore, among the fluorescence emitted from the light emitting section, most of fluorescence that cannot be controlled by the reflecting mirror is emitted toward the reflecting mirror of the vehicle headlamp, i.e., downwardly (viewed in the vertical direction). Consequently, it is possible to illuminate, with light controlled by the reflecting mirror, a distant space (i.e., a space in front of the vehicle). Further, it is also possible to illuminate, with the fluorescence that cannot be controlled by the reflecting mirror, a space in the vicinity of the vehicle and a lower space.

Thus, according to the above configuration, it is possible to effectively use the fluorescence that cannot be controlled by the reflecting mirror and to enlarge an illumination range of the vehicle headlamp while brightly illuminating the space in front of the vehicle.

Advantageous Effects of Invention

As described above, a light emitting device of the present invention includes: an excitation light source for emitting excitation light; a light emitting section for emitting fluorescence upon receiving the excitation light emitted from the excitation light source; and a light projecting section for projecting, along a predetermined light projection direction, the fluorescence emitted by the light emitting section, a part of the light projecting section being provided so as to face a main light emitting surface of the light emitting section, the main light emitting surface having a larger area than that of a side surface of the light emitting section, and the light emitting section emitting the fluorescence in such a manner that distribution of the fluorescence corresponds to Lambertian distribution.

Further, a light emitting device of the present invention includes: an excitation light source for emitting excitation light; a light emitting section for emitting fluorescence upon receiving the excitation light emitted from the excitation light source; and a light projecting section for projecting, along a predetermined light projection direction, the fluorescence emitted by the light emitting section, a part of the light projecting section being provided so as to face a main light emitting surface of the light emitting section, the main light emitting surface having a larger area than that of a side surface of the light emitting section, and the light emitting section having a small thickness, or a spot of the excitation light incident on a surface of the light emitting section having a smaller area than that of the surface.

Further, a vehicle of the present invention includes a vehicle headlamp, the vehicle headlamp including: an excitation light source for emitting excitation light; a light emitting section for emitting fluorescence upon receiving the excitation light emitted from the excitation light source; a reflecting mirror having a reflecting curved surface for reflecting, toward a front of the vehicle, the fluorescence emitted by the light emitting section; and a supporting member having a surface (i) facing the reflecting curved surface and (ii) supporting the light emitting section, a part of the reflecting mirror being provided so as to face a main light emitting surface of the light emitting section, the main light emitting surface having a larger area than that of a side surface of the light emitting section, the light emitting section emitting the fluorescence in such a manner that distribution of the fluorescence corresponds to Lambertian distribution, and the vehicle headlamp being mounted in the vehicle so that the reflecting curved surface is located on a lower side in a vertical direction.

Further, a vehicle of the present invention includes a vehicle headlamp, the vehicle headlamp including: an excitation light source for emitting excitation light; a light emitting section for emitting fluorescence upon receiving the excitation light emitted from the excitation light source; a reflecting mirror having a reflecting curved surface for reflecting, toward a front of the vehicle, the fluorescence emitted by the light emitting section; and a supporting member having a surface (i) facing the reflecting curved surface and (ii) supporting the light emitting section, a part of the reflecting mirror being provided so as to face a main light emitting surface of the light emitting section, the main light emitting surface having a larger area than that of a side surface of the light emitting section, the light emitting section having a small thickness, or a spot of the excitation light incident on a surface of the light emitting section having a smaller area than that of the surface, and the vehicle headlamp being mounted in the vehicle so that the reflecting curved surface is located on a lower side in a vertical direction.

Therefore, the present invention brings about an effect of reducing an amount of fluorescence that cannot be controlled by a light projecting section (reflecting mirror), thereby increasing use efficiency of fluorescence.

BRIEF DESCRIPTION OF DRAWINGS

FIG. 3(*a*) is a top view of the parabolic mirror.

FIG. 3(*b*) is a front view of the parabolic mirror.

FIG. 3(*c*) is a side view of the parabolic mirror.

FIG. 5(*b*) is a graph overlapping the graph of FIG. 5(*a*) and showing an optical emission property of a light emitting section having a large thickness.

FIG. 10(*b*) is an enlarged view of the elliptic spot shown in FIG. 10(*a*).

FIG. 11(*b*) is a graph showing illuminance distribution of the elliptic spot shown in FIG. 10(*b*) which illuminance distribution is observed along a short axis direction of the elliptic spot.

FIG. 14(*b*) is an explanatory view schematically illustrating the light condensing effect of the cylindrical lens shown in FIG. 13, and is a top view seen in a Y-axis direction of FIG. 13.

FIG. 15(*b*) is a side view of the elliptic lens shown in FIG. 15(*a*).

DESCRIPTION OF EMBODIMENTS

The following will describe one embodiment of the present invention with reference to FIGS. 1 through 18.

<Configuration of Headlamp 1>

Figure 1:
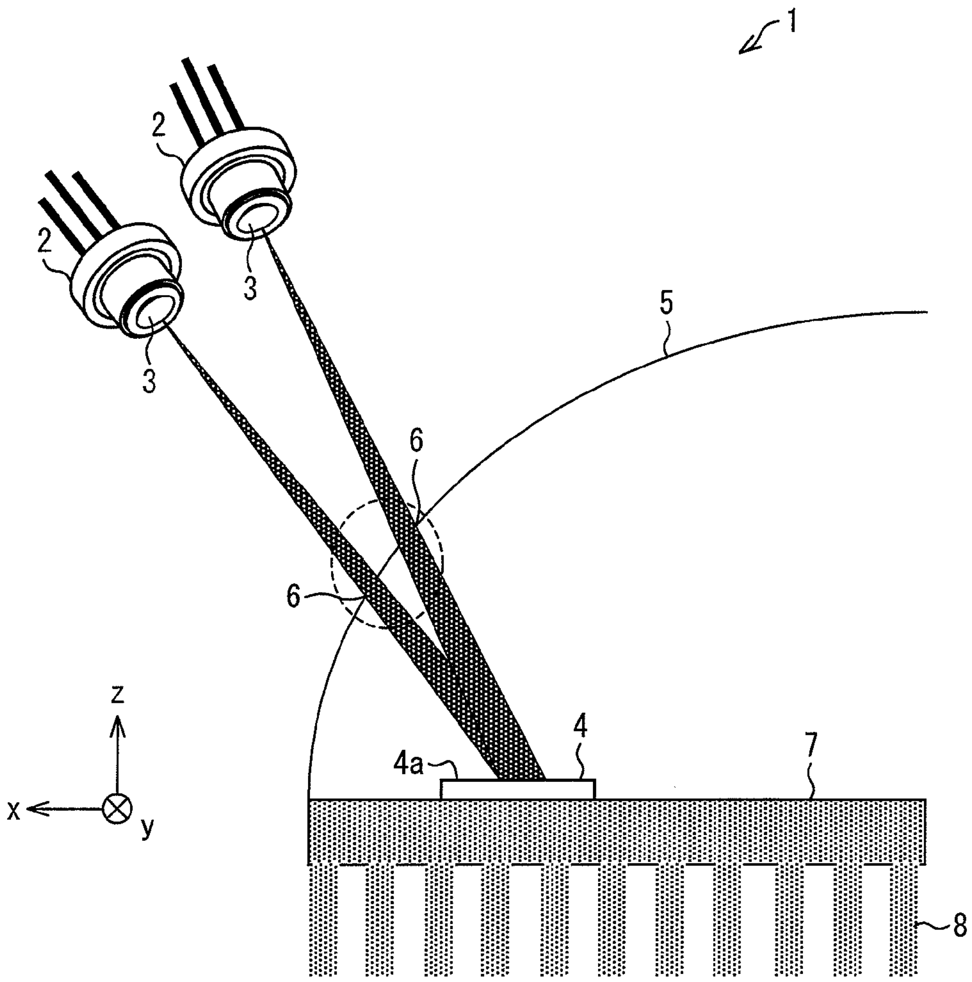
FIG. 1 is a cross-section view schematically illustrating a configuration of a headlamp in accordance with an embodiment of the present invention.

FIG. 1 is a cross-section view schematically illustrating a configuration of a headlamp 1 in accordance with one embodiment of the present invention. As shown in FIG. 1, the headlamp 1 includes a laser element (excitation light source, semiconductor laser) 2, a lens 3, a light emitting section 4, a parabolic mirror (light projecting section, reflecting mirror) 5, a metallic base (heat conductive member, supporting member) 7, and fins (cooling section) 8.

(Laser Element 2)

The laser element 2 is a light emitting element functioning as an excitation light source for emitting excitation light. The number of laser elements 2 may be more than one. In the case where a plurality of laser elements 2 are provided, each of the laser elements 2 emits a laser beam serving as excitation light. Instead of the plurality of laser elements 2, only one laser element 2 may be provided. However, a high-power laser beam can be more easily attained with a plurality of laser elements 2 than with only one laser element 2.

The laser element 2 may be a single chip having a single light emitting point, or a single chip having a plurality of light emitting points. The laser element 2 emits a laser beam having a wavelength of, e.g., 405 nm (blue-violet) or 450 nm (blue). However, the wavelength of the laser beam is not limited to these, and can be determined appropriately in accordance with a type of a fluorescent material contained in the light emitting section 4.

Further, instead of the laser element, it is possible to use a light emitting diode (LED) as the excitation light source (light emitting element).

(Lens 3)

The lens 3 is a lens for adjusting (e.g., magnifying) an emission range of the laser beam in order that the laser beam from the laser element 2 is appropriately incident on the light emitting section 4. Such magnifying lenses 3 are provided for the respective laser elements 2.

(Light Emitting Section 4)

The light emitting section 4 emits fluorescence upon receiving the laser beam emitted from the laser element 2. The light emitting section 4 includes a fluorescent material for emitting light upon receiving the laser beam. Specifically, the light emitting section 4 is (i) the one made of a sealing material in which the fluorescent material is dispersed, (ii) the fluorescent material pressed into a solid, (iii) particles of the fluorescent material deposited on a substrate which is made from a material having high heat conductivity, (iv) or the like. Because the light emitting section 4 converts a laser beam into fluorescence, the light emitting section 4 can be called a wavelength conversion element.

The light emitting section 4 is provided on the metallic base 7 and substantially at a focal point of the parabolic mirror 5. Accordingly, the fluorescence emitted from the light emitting section 4 is reflected by a reflecting curved surface of the parabolic mirror 5, so that an optical path of the fluorescence is controlled. The light emitting section 4 includes an upper surface (main light emitting surface) 4*a*, which is a laser beam irradiated surface onto which most of the laser beam is emitted. The upper surface 4*a* of the light emitting section 4 can be provided with an anti-reflection structure for preventing reflection of the laser beam.

Examples of the fluorescent material of the light emitting section 4 encompass an oxynitride fluorescent material (e.g., a sialon fluorescent material) and a III-V compound semiconductor nanoparticle fluorescent material (e.g., indium phosphide: InP). These fluorescent materials are high in heat resistance against the high-power (and/or high-light density) laser beam emitted from the laser element 2, and therefore are suitably used in a laser illumination light source. Note, however, that the fluorescent material of the light emitting section 4 is not limited to those described above, and other fluorescent materials, such as a nitride fluorescent material, can be employed.

Further, under the Japanese law, a color of illumination light of a headlamp is limited to white having chromaticity in a predetermined range. For this reason, the light emitting section 4 includes a fluorescent material(s) with which white illumination light is obtained.

For example, white light can be generated by emitting a laser beam of 405 nm onto a light emitting section 4 containing a blue fluorescent material, a green fluorescent material, and a red fluorescent material. Alternatively, white light can be generated by emitting a laser beam of 450 nm (blue) (or a so-called blue-like laser beam having a peak wavelength in a range of 440 nm or more but not more than 490 nm) onto a light emitting section 4 containing a yellow fluorescent material (or a green fluorescent material and a red fluorescent material).

Examples of the sealing material of the light emitting section 4 encompass a glass material (inorganic glass, organic-inorganic hybrid glass) and a resin material such as a silicone resin. The glass material may be glass having a low melting point. It is preferable that the sealing material has high transparency. In a case where a high-power laser beam is used, it is preferable that the sealing material has high heat resistance.

(Parabolic Mirror 5)

The parabolic mirror 5 is a light projecting member for projecting, along a predetermined light projection direction, the fluorescence generated by the light emitting section 4. In the present embodiment, the parabolic mirror 5 is used as the light projecting member. The parabolic mirror 5 reflects the fluorescence generated by the light emitting section 4 so as to form a pencil of beams (illumination light) that travels in a predetermined solid angle. The parabolic mirror 5 may be, e.g., (i) a member whose surface is coated with a metal thin film or (ii) a metallic member.

Figure 2:
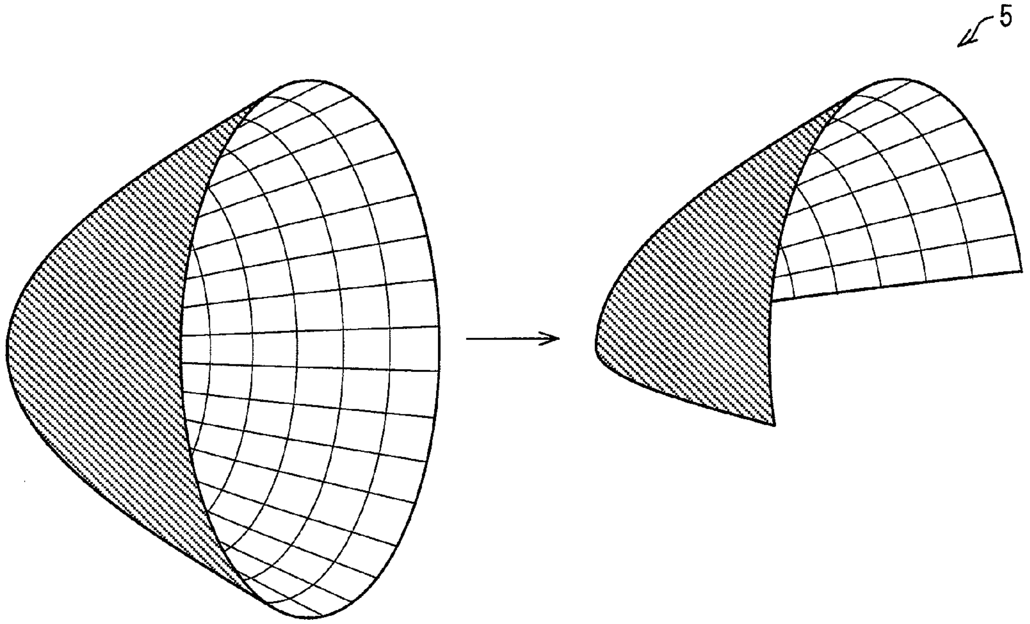
FIG. 2 is a view conceptually illustrating a paraboloid of revolution of a parabolic mirror.

FIG. 2 is a view conceptually illustrating a paraboloid of revolution of the parabolic mirror 5. FIG. 3(*a*) is a top view of the parabolic mirror 5. FIG. 3(*b*) is a front view of the parabolic mirror 5. FIG. 3(*c*) is a side view of the parabolic mirror 5. For simple explanation, each of FIG. 3(*a*) through FIG. 3(*c*) shows an example where the parabolic mirror 5 is formed by hollowing out an inside of a rectangular solid member.

As shown in FIG. 2, the parabolic mirror 5 includes, as its reflecting surface, at least a part of a partial curved surface obtained by (i) forming a curved surface (parabolic curved surface) by rotating a parabola around a rotational axis which is a symmetric axis of the parabola, and by (ii) cutting the curved surface along a plane including the rotational axis. The parabolic curved surface is shown as the curved line indicated by the sign 5*a* in each of FIG. 3(*a*) and FIG. 3(*c*). Further, as shown in FIG. 3(*b*), an opening section 5*b* (an exit through which illumination light exits) of the parabolic mirror 5 is shaped in a half circle when the parabolic mirror 5 is viewed from the front.

A part of the parabolic mirror 5 having such a shape is positioned so as to face the upper surface 4*a* of the light emitting section 4, which upper surface 4*a* has a larger area than that of a side surface of the light emitting section 4 and via which upper surface 4*a* most of the fluorescence is emitted. That is, the parabolic mirror 5 is positioned so as to cover the upper surface 4*a* of the light emitting section 4. From another point of view, a part of the side surface of the light emitting section 4 faces the opening section 5*b* of the parabolic mirror 5.

With the above positional relationship between the light emitting section 4 and the parabolic mirror 5, it is possible to efficiently project the fluorescence of the light emitting section 4 into a narrow solid angle. As a result, it is possible to increase use efficiency of the fluorescence.

The laser element 2 is provided outside the parabolic mirror 5, and the parabolic mirror 5 is provided with a window section 6 through which the laser beam is transmitted or passed. The window section 6 can be an opening section or a section including a transparent member which can transmit a laser beam. For example, the window section 6 may be a transparent plate provided with a filter which transmits a laser beam but reflects white light (fluorescence generated by the light emitting section 4). With this configuration, it is possible to prevent the fluorescence generated by the light emitting section 4 from leaking from the window section 6.

The number of window sections 6 is not particularly limited. A single window section 6 can be shared by a plurality of laser elements 2. Alternatively, a plurality of window sections 6 can be provided for a plurality of laser elements 2, respectively.

Note that a part of the parabolic mirror 5 may not be a part of the parabola. Further, the reflecting mirror of the light emitting device of the present invention can be (i) a parabolic mirror having an opening section shaped in a closed ring or (ii) the one including a part of such a parabolic mirror.

Furthermore, the reflecting mirror is not limited to the parabolic mirror, but may be a mirror having an elliptic surface or a mirror having a hemispheric surface. That is, the reflecting mirror can be any mirror provided that it includes, as its reflecting surface, at least a part of a curved surface formed by rotating a figure (ellipse, circle, parabola) around a rotational axis.

Instead of the reflecting mirror, it is possible to use a projector lens which transmits and deflects the fluorescence generated by the light emitting section 4, in order to project the fluorescence along the predetermined light projection direction.

(Metallic Base 7)

The metallic base 7 is a plate-shaped supporting member for supporting the light emitting section 4, and is made from a metal (e.g., copper or iron). Accordingly, the metallic base 7 has high heat conductivity and can efficiently dissipate heat generated by the light emitting section 4. Note that the member for supporting the light emitting section 4 is not limited to a member made from a metal, but may be a member containing a material (glass, sapphire, etc.) having high heat conductivity other than a metal.

Note also that, preferably, a surface of the metallic base 7 which surface is in contact with the light emitting section 4 functions as a reflecting surface. Configuring the surface of the metallic base 7 as the reflecting surface enables the followings: (i) After a laser beam entering the light emitting section 4 via the upper surface 4*a* is converted into fluorescence, the fluorescence is reflected by the reflecting surface so as to be directed toward the parabolic mirror 5. (ii) A laser beam entering the light emitting section 4 via the upper surface 4*a* is reflected by the reflecting surface and is directed to the inside of the light emitting section 4, so that the laser beam is converted into fluorescence.

The metallic base 7 is covered with the parabolic mirror 5. That is, the metallic base 7 has a surface facing the reflecting curved surface (parabolic curved surface) of the parabolic mirror 5. Preferably, the surface of the metallic base 7 on which surface the light emitting section 4 is provided is substantially parallel to the rotational axis of the paraboloid of revolution of the parabolic mirror 5 and substantially includes the rotational axis.

(Fins 8)

The fins 8 function as a cooling section (heat dissipation mechanism) for cooling the metallic base 7. The fins 8 are configured as a plurality of heat dissipating plates, so that the fins 8 have an increased contact area with the atmosphere. This allows the fins 8 to have improved heat dissipation efficiency. The cooling section for cooling the metallic base 7 only needs to have a cooling (heat dissipation) function. The cooling section may employ a heat pipe, a water-cooling system, or an air-cooling system, as described later.

<Shape of Light Emitting Section 4>

(Thickness of Light Emitting Section 4)

Figure 4:
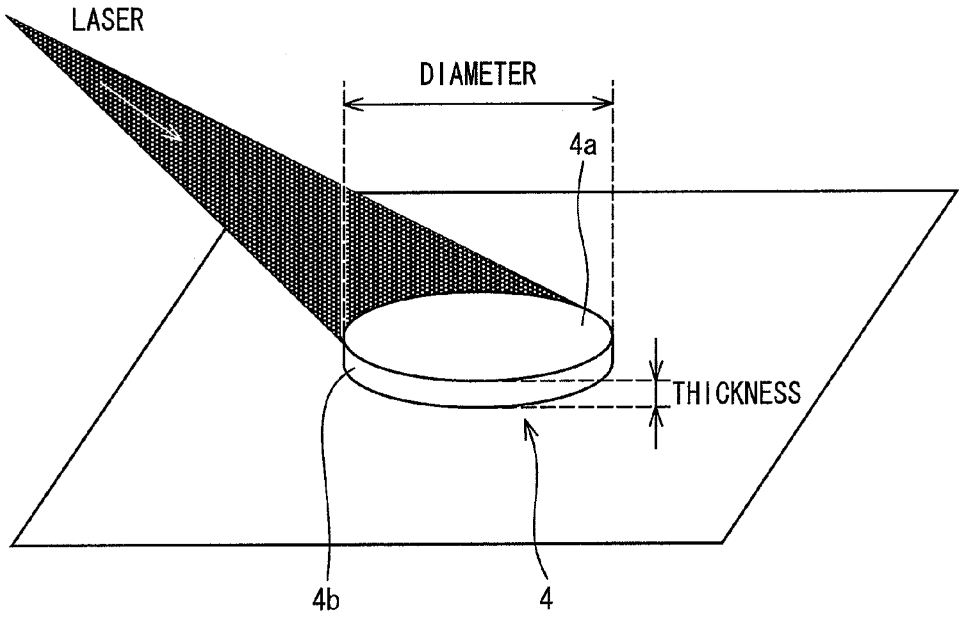
FIG. 4 is a view illustrating a state where a laser beam is emitted onto a light emitting section.

FIG. 4 is a view illustrating a state where a laser beam is emitted onto the light emitting section 4. FIG. 4 shows the light emitting section 4 shaped in a circular cylinder. The light emitting section 4 has the upper surface 4*a* via which most of the laser beam is received. A distance between the upper surface 4*a* and a bottom surface of the light emitting section 4, which bottom surface faces the upper surface 4*a*, corresponds to a thickness of the light emitting section 4. The light emitting section 4 preferably has a small thickness. In other words, an area of a side surface 4*b* of the light emitting section 4 is preferably small. The description that "the light emitting section has a small thickness" means a shape of the light emitting section 4 that the side surface 4*b* has a sufficiently smaller area than that of the upper surface 4*a* and therefore most of the fluorescence is emitted upwardly (i.e., emitted via the upper surface 4*a*). The following description deals with the reason why the light emitting section 4 preferably has a small thickness.

The light emitting section 4 shown in FIG. 4 is shaped in a circular cylinder having the circular upper surface 4*a*. However, the shape of the light emitting section 4 is not particularly limited, and can be suitably changed if necessary.

Figure 5:
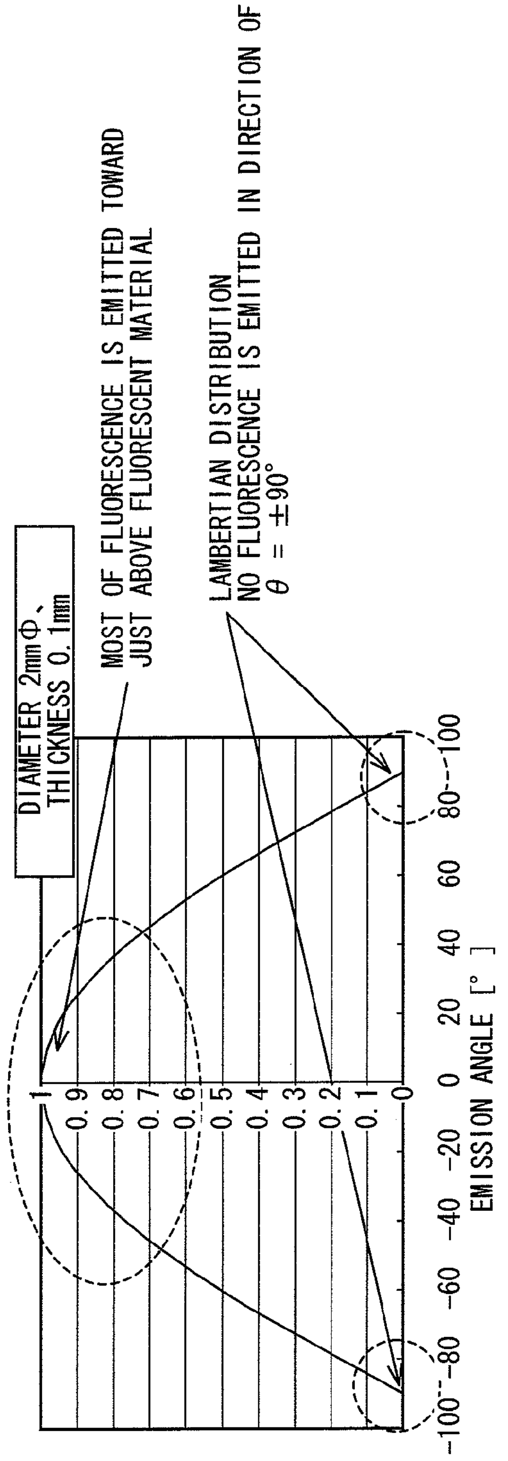
FIG. 5(*a*) is a graph showing an optical emission property of a light emitting section having a small thickness.
Figure 5:
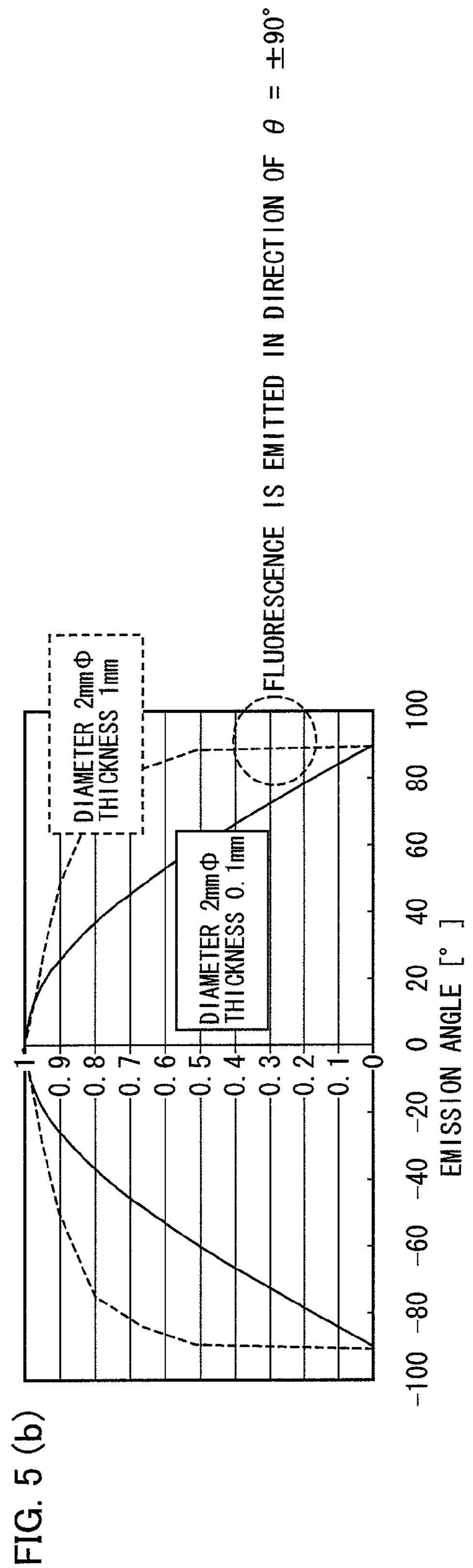

FIG. 5(*a*) is a graph showing an optical emission property of a light emitting section 4 having a small thickness (diameter: 2 mm, thickness: 0.1 mm). FIG. 5(*b*) is a graph overlapping the graph of FIG. 5(*a*) and showing an optical emission property of a light emitting section 4 having a large thickness (diameter: 2 mm, thickness: 1 mm).

As shown in FIG. 5(*a*), in the case of the light emitting section 4 having the small thickness, the light emitting section 4 has a side surface 4*b* whose area is small, and therefore most of the fluorescence is emitted toward just above the light emitting section 4. Namely, the fluorescence is hardly emitted in a direction inclined at 90° ($\theta=\pm 90°$) with respect to a line perpendicular to an upper surface 4*a* of the light emitting section 4. Thus, distribution of the fluorescence corresponds to the Lambertian distribution (i.e., fluorescence emission distribution being approximate to $\cos(\theta)$, where an angle with respect to the line perpendicular to the upper surface of the light emitting section is $\theta$).

On the other hand, as shown in FIG. 5(*b*), in the case of the light emitting section 4 having the large thickness, the fluorescence is emitted in a direction inclined at 90° (θ=±90°) with respect to a line perpendicular to an upper surface 4*a* of the light emitting section 4. Thus, distribution of the fluorescence does not correspond to the Lambertian distribution. That is, there is an increase in a percentage of the fluorescence emitted from the side surface 4*b* of the light emitting section 4. A part of the fluorescence emitted from the side surface 4*b* of the light emitting section 4 is not incident on the parabolic mirror 5 but is emitted to the outside via the opening section 5*b* of the parabolic mirror 5, so as to be dispersed in the atmosphere (see FIG. 17). Therefore, in the case where the percentage of the fluorescence emitted from the side surface 4*b* of the light emitting section 4 is increased, an amount of fluorescence that cannot be controlled by the parabolic mirror 5 is increased. This results in a reduction in use efficiency of the fluorescence (and also use efficiency of the laser beam).

Thus, designing the light emitting section 4 to have a small thickness makes it possible to reduce a percentage of fluorescence that cannot be controlled by the parabolic mirror 5, and therefore to increase use efficiency of the fluorescence generated by the light emitting section 4.

Figure 6:
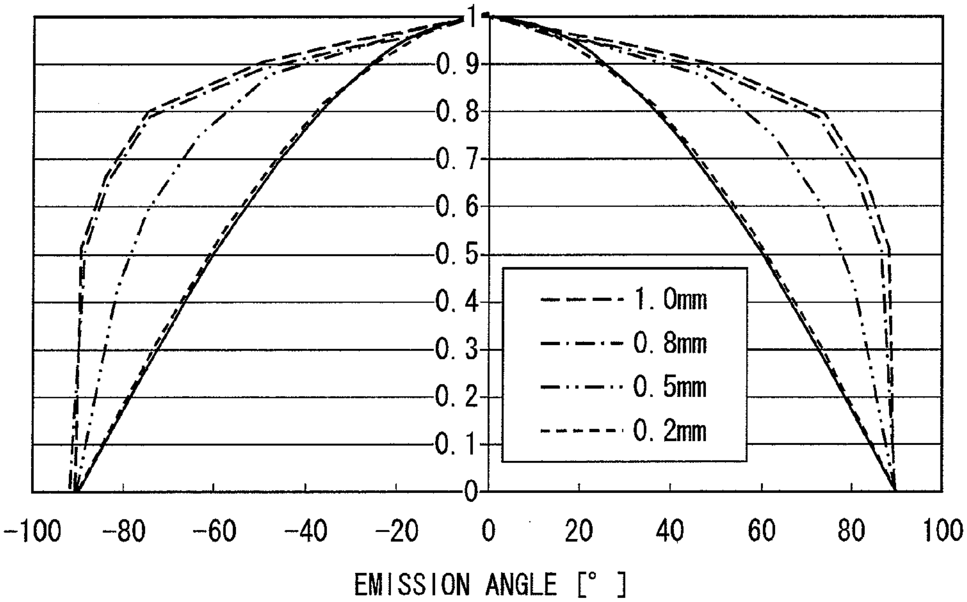
FIG. 6 is a graph showing a relationship between a thickness of the light emitting section and an optical emission property of the light emitting section.

FIG. 6 is a graph showing a relationship between a thickness of the light emitting section 4 and an optical emission property of the light emitting section 4. Here, a diameter of the light emitting section 4 is set to 2 mm, and the thickness of the light emitting section 4 is decreased from 1.0 mm to 0.2 mm in stages. Then, as shown in FIG. 6, distribution of the fluorescence corresponds to the Lambertian distribution when the thickness of the light emitting section 4 is 0.2 mm.

Therefore, the thickness of the light emitting section 4 is preferably set to be not more than one-tenth of a maximum width among widths of the light emitting section 4 which widths are along a direction perpendicular to a thickness direction of the light emitting section 4 (i.e., along a lateral direction). In a case where the light emitting section 4 is shaped in a circular cylinder, the maximum width is equal to the diameter of the upper surface of the light emitting section 4. Whereas, in a case where the light emitting section 4 is shaped in a rectangular solid, the maximum width is equal to a length of a diagonal line of the upper surface (rectangle) of the light emitting section 4.

In a case where the thickness of the light emitting section 4 is too small, an amount of resulting illumination light might be insufficient. In order to avoid this, the lower limit of the thickness of the light emitting section 4 is set to be equal to a minimum thickness among thicknesses with which a desired amount of illumination light can be obtained. As an extreme instance, the lower limit of the thickness of the light emitting section 4 is equal to a thickness of a single fluorescent layer, which is necessary at minimum, and such lower limit is, e.g., 10 μm. Further, the upper limit (absolute value) of the thickness of the light emitting section 4 is preferably set also taking into consideration of the heat dissipation efficiency of the light emitting section 4. The reason for this is as follows. As the light emitting section 4 has a greater thickness, the heat dissipation efficiency is reduced in a side of the light emitting section 4 which side is opposite to another side of the light emitting section 4, the another side being in contact with the metallic base 7.

(Area of Laser Beam Irradiated Surface of Light Emitting Section 4)

Instead of by reducing the thickness of the light emitting section 4, the distribution of the fluorescence of the light emitting section 4 can be made correspond to the Lambertian distribution by setting a spot of a laser beam being incident on the laser beam irradiated surface (the upper surface 4*a* or the bottom surface, i.e., a surface on which the laser beam is incident) of the light emitting section 4 to have a smaller area than an area of the laser beam irradiated surface. That is, the distribution of the fluorescence generated by the light emitting section 4 can be made correspond to the Lambertian distribution by exciting, with a laser beam, a part of the light emitting section 4 (i.e., a part of the light emitting section 4 which part is in the vicinity of a center of the light emitting section 4).

Figure 7:
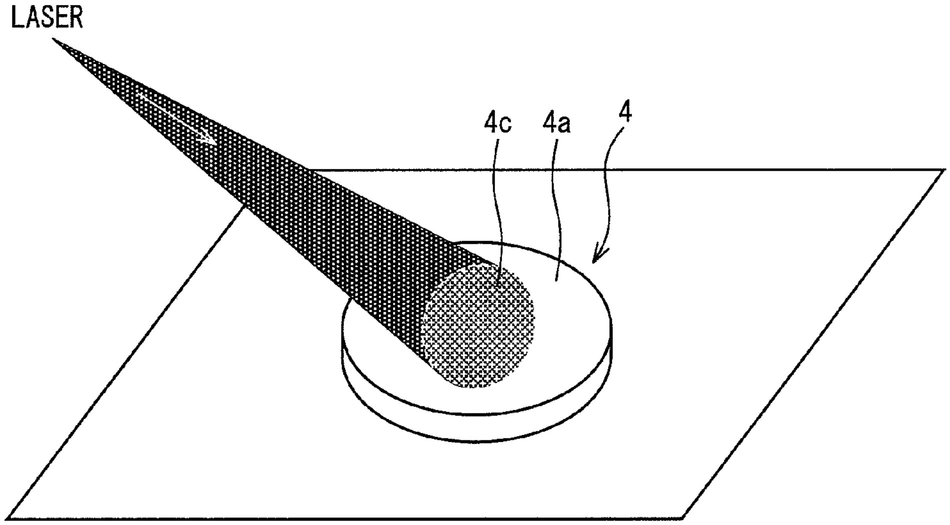
FIG. 7 is a view illustrating a state where a laser beam is incident on an upper surface of the light emitting section.

FIG. 7 is a view illustrating a spot 4*c* of a laser beam which is incident on the upper surface 4*a* of the light emitting section 4. As shown in FIG. 7, the upper surface 4*a* of the light emitting section 4 has a larger area than an area of the spot 4*c* of the laser beam. With this, the distribution of the fluorescence generated by the light emitting section 4 corresponds to the Lambertian distribution, irrespective of the thickness of the light emitting section 4. The reason for this is considered as follows. The fluorescence traveling toward the side surface of the light emitting section 4 is diffused inside the light emitting section 4, and consequently is not emitted via the side surface of the light emitting section 4.

A percentage of the area of the spot of the laser beam with respect to the area of the laser beam irradiated surface only needs to be reduced to such a degree that the laser beam would not leak from the side surface of the light emitting section 4. Note that there is no upper limit for the area of the laser beam irradiated surface.

<Depth of Parabolic Mirror 5>

The parabolic mirror 5 preferably has a depth substantially equal to a radius of a circle or a half circle which is a shape of the opening section 5*b* of the parabolic mirror 5. The reason for this will be described below. Note that the depth of the parabolic mirror 5 corresponds to a distance from (i) a plane including the opening section 5*b* of the parabolic mirror 5 to (ii) the vertex of the parabolic mirror 5. In other words, the depth of the parabolic mirror 5 refers to a maximum length among lengths of perpendicular lines extending from (i) the plane including the opening section 5*b* of the parabolic mirror 5 to (ii) the reflecting curved surface of the parabolic mirror 5.

Figure 8:
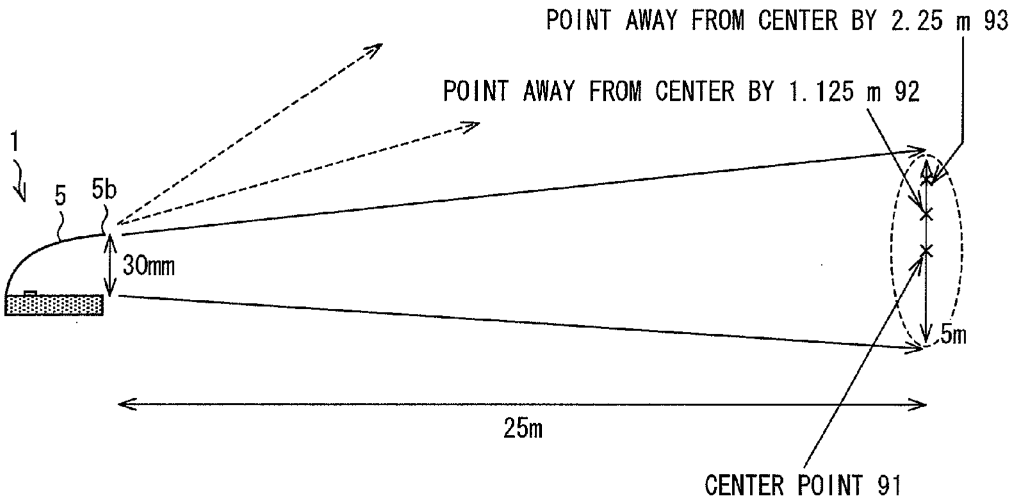
FIG. 8 is an explanatory view illustrating illuminance distribution of a spot of illumination light emitted by the headlamp.

FIG. 8 is an explanatory view illustrating illuminance distribution of a spot of illumination light emitted by the headlamp 1. FIG. 8 shows a center point 91, a point 92, and a point 93, each of which is in a 2.5 m-radius spot of illumination light on a vertical plane (hereinafter, referred to as a "reference plane W") being away by 25 m from the 30 m-radius opening section 5*b* of the parabolic mirror 5 and facing the opening section 5*b*. The center point 91 is at a center of the 2.5 m-radius spot of the illumination light, the point 92 is away from the center by 1.125 m, and the point 93 is away from the center by 2.25 m.

Figure 9:
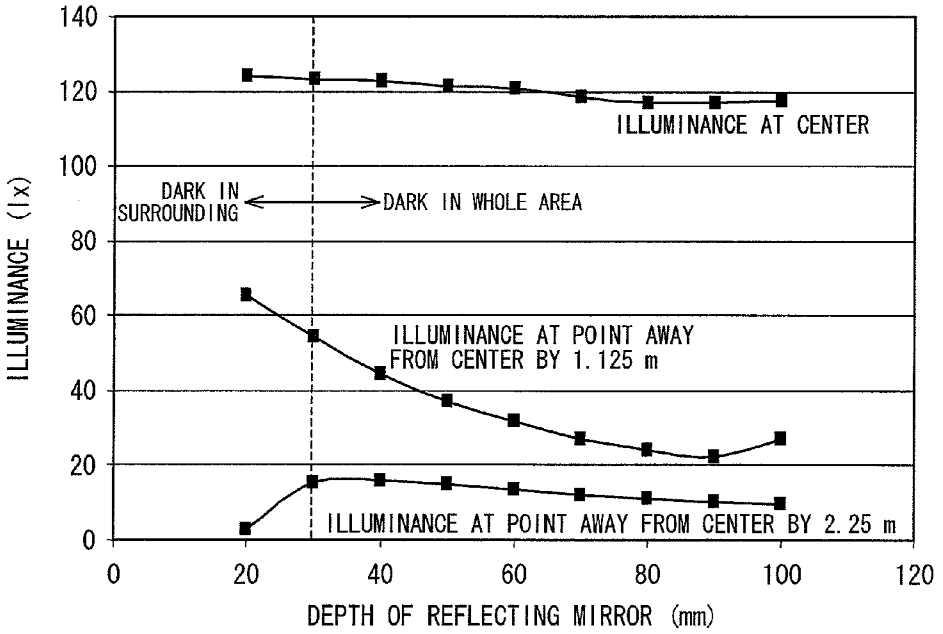
FIG. 9 is a graph showing changes in respective illuminances at points in the spot of the illumination light, which changes were observed under the condition that a depth of the parabolic mirror was changed in stages.

FIG. 9 is a graph showing changes in respective illuminances at the point 91, the point 92, and the point 93, which changes were observed under the condition that the depth of the parabolic mirror 5 was changed from 20 mm to 100 mm in stages. As shown in FIG. 9, as the depth of the parabolic mirror 5 becomes greater, the illuminance at the point 92 (i.e., the point which is away from the center by 1.125 m) drops to a greater degree than the illuminances at the other two points. Meanwhile, under the condition that the depth of the parabolic mirror 5 is 20 mm, the illuminance at the point 93 (i.e., the point which is away from the center by 2.25 m) drops significantly.

In view of these, in order to achieve a spot of illumination light having balanced illuminances, it is preferable to set the depth of the parabolic mirror 5 to 30 mm. Namely, it is preferable that the depth of the parabolic mirror 5 is substantially equal to a radius of a half circle which is the shape of the opening section 5*b* of the parabolic mirror 5. Note that the same applies to a parabolic mirror having an opening section shaped in a circle.

Desired illuminance distribution of a spot of illumination light changes according to a use of an illumination device. Therefore, the depth of the parabolic mirror 5 can be made adjustable in order to allow the illuminance distribution of the spot of the illumination light to be adjustable according to the use.

<Shape of Spot of Laser Beam Incident on Light Emitting Section 4>

For the headlamp 1, light distribution property standards such as a luminous intensity, an orientation of an optical axis, and/or light distribution are specified. Countries have their respective different light distribution property standards. Therefore, the spot of the illumination light needs to be formed so as to comply with the various light distribution property standards.

According to the light distribution property standards, the spot of the illumination light on the reference plane W needs to have a vertical to horizontal ratio of, e.g., approximately 1:3 to 1:4. This vertical to horizontal ratio of the spot of the illumination light is suitable to efficiently illuminate the center of a road, pavements along both sides of the road, and road signs.

By regulating a shape of a spot of a laser beam incident on the upper surface 4*a* of the light emitting section 4, the headlamp 1 can form a spot of illumination light which spot has a vertical to horizontal ratio satisfying the light distribution property standards.

Figure 10:
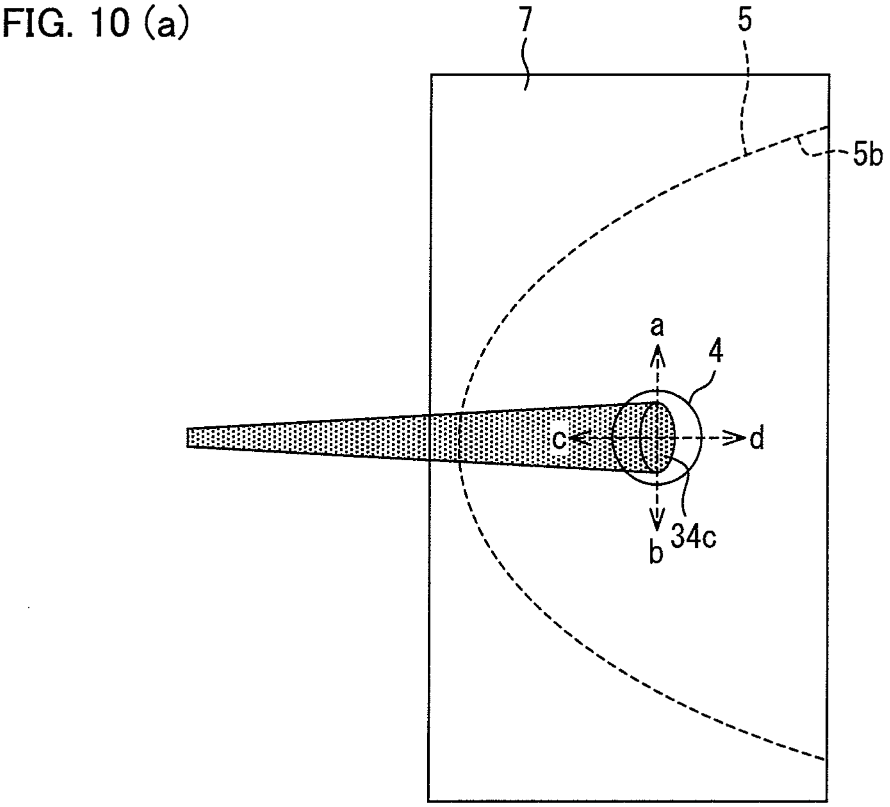
FIG. 10(*a*) is a perspective view showing the top of the headlamp observed when a laser beam is incident on the light emitting section in such a manner that an elliptic spot is formed on the light emitting section.
Figure 10:
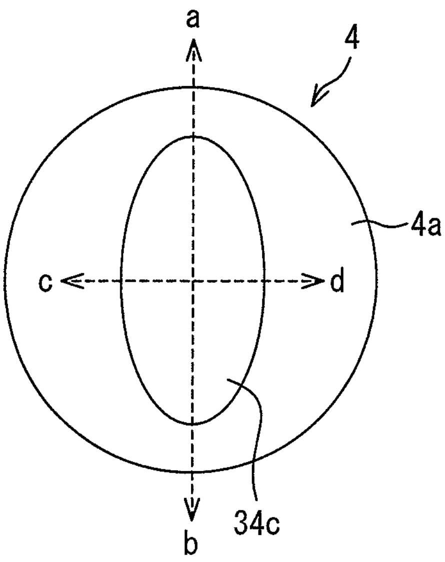

FIG. 10(*a*) is a perspective view showing the top of the headlamp 1 observed when a laser beam is incident on the upper surface 4*a* of the light emitting section 4 in such a manner that an elliptic spot 34*c* is formed on the upper surface 4*a*. FIG. 10(*b*) is an enlarged view of the elliptic spot 34*c* shown in FIG. 10(*a*).

As shown in FIGS. 10(*a*) and 10(*b*), the elliptic spot 34*c* incident on the upper surface 4*a* of the light emitting section 4 is shaped to have (i) a long axis along a direction orthogonal to a light projection direction (in FIG. 10(*b*), c→d direction) of the parabolic mirror 5 and (ii) a short axis along a direction (in FIG. 10(*b*), c-d direction; hereinafter, referred to as a "short axis direction") orthogonal to the long axis direction (in FIG. 10(*b*), a-b direction). Each member is positioned so that an intersection of "a-b" and "c-d" in FIG. 10(*b*), i.e., a center point of the elliptic spot 34*c*, coincides with the focal point of the parabolic mirror 5.

Causing a laser beam to be incident on the upper surface 4*a* of the light emitting section 4 in such a manner that the laser beam forms the above-described elliptic spot 34*c* on the upper surface 4*a* allows the headlamp 1 to emit illumination light spreading in the direction orthogonal to the light projection direction.

Figure 11:
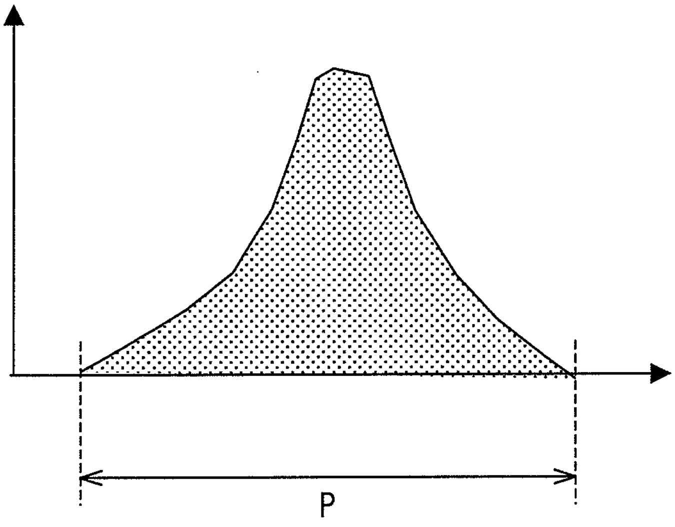
FIG. 11(*a*) is a graph showing illuminance distribution of the elliptic spot shown in FIG. 10(*b*) which illuminance distribution is observed along a long axis direction of the elliptic spot.
Figure 11:
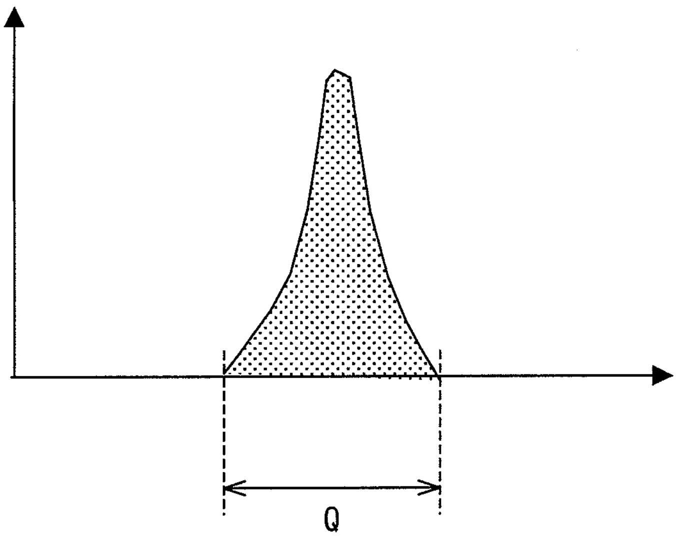

Each of FIGS. 11(*a*) and 11(*b*) is a graph showing illuminance distribution of the elliptic spot 34*c* shown in FIG. 10(*b*). FIG. 11(*a*) shows illuminance distribution of the elliptic spot 34*c* which illuminance distribution is observed along the long axis direction of the elliptic spot 34*c*. FIG. 11(*b*) shows illuminance distribution of the elliptic spot 34*c* which illuminance distribution is observed along the short axis direction of the elliptic spot 34*c*.

As shown in FIG. 11(*a*) and FIG. 11(*b*), the elliptic spot 34*c* is incident on the upper surface 4*a* of the light emitting section 4 in such a manner that the shape of the elliptic spot 34*c* is regulated so as to have (i) a maximum width P, which is a maximum width among widths of the elliptic spot 34*c* along the long axis direction, and (ii) a maximum width Q, which is a maximum width among widths of the elliptic spot 34*c* along the short axis direction, the maximum width P being approximately three times greater than the maximum width Q.

In a case where such the elliptic spot 34*c* of the laser beam is incident on the upper surface 4*a* of the light emitting section 4, the headlamp 1 emits illumination light forming a spot having a vertical to horizontal ratio of 1:3. This has been confirmed by the inventors of the present invention.

Figure 12:
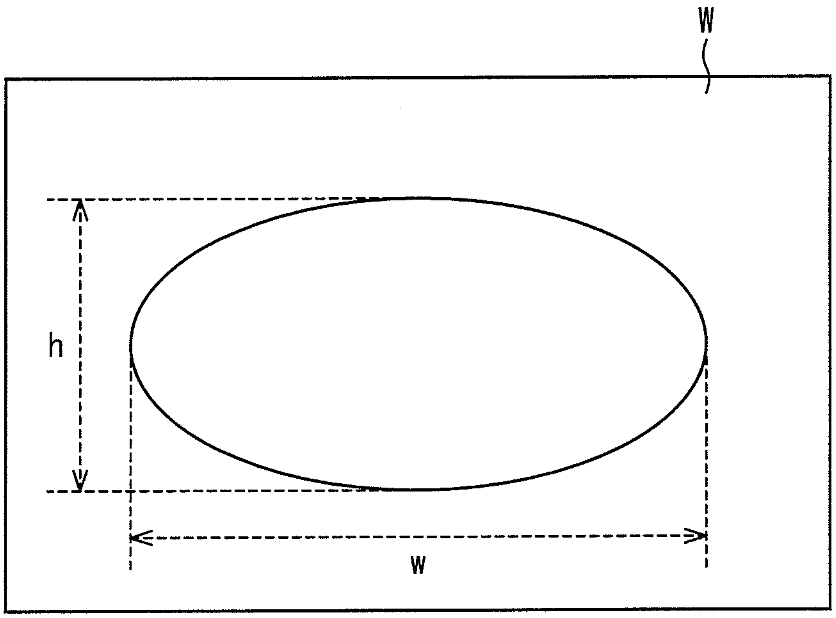
FIG. 12 is a front view of a spot of illumination light projected on a reference plane by the headlamp.

FIG. 12 is a front view of a spot of illumination light projected on the reference plane W by the headlamp 1. The spot shown in FIG. 12 is formed by the illumination light emitted from the headlamp 1. Here, the headlamp 1 is disposed so that a surface of the metallic base 7 which surface is in contact with the light emitting section 4 is substantially horizontal.

As shown in FIG. 12, a laser beam is incident on the upper surface 4*a* of the light emitting section 4 in such a manner that the laser beam forms, on the upper surface 4*a*, an elliptic spot 34*c* having (i) a maximum width P, which is a maximum width among widths of the elliptic spot 34*c* along the long axis direction, and (ii) a maximum width Q, which is a maximum width among widths of the elliptic spot 34*c* along the short axis direction, the maximum width P being approximately three times greater than the maximum width Q. This allows the headlamp 1 to illuminate the reference plane W with illumination light forming a spot having a vertical to horizontal ratio h:w of 1:3.

For another example, a laser beam may be incident on the upper surface 4*a* of the light emitting section 4 in such a manner that the laser beam forms, on the upper surface 4*a*, an elliptic spot 34*c* having (i) a maximum width P, which is a maximum width among widths of the elliptic spot 34*c* along the long axis direction, and (ii) a maximum width Q, which is a maximum width among widths of the elliptic spot 34*c* along the short axis direction, the maximum width P being approximately four times greater than the maximum width Q. This allows the headlamp 1 to illuminate the reference plane W with illumination light forming a spot having a vertical to horizontal ratio h:w of 1:4.

As described above, according to the headlamp 1, a shape of a spot 34*c* of a laser beam incident on the upper surface 4*a* of the light emitting section 4 is regulated. This allows the headlamp 1 to provide suitable illumination light forming a spot having a vertical to horizontal ratio satisfying the light distribution property standards.

Note that there is no particular limitation on means for causing the laser beam to be incident on the light emitting section 4 in such a manner that the laser beam forms the elliptic spot 34*c* on the light emitting section 4. For example, a cylindrical lens (plane-convex lens) can be used as such means.

Figure 13:
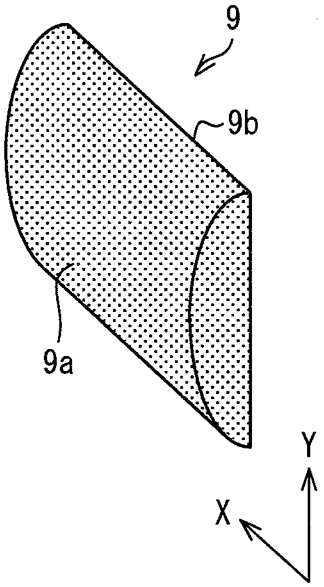
FIG. 13 is an oblique perspective view of a cylindrical lens for regulating a shape of a spot of a laser beam incident on the light emitting section.

FIG. 13 is an oblique perspective view of a cylindrical lens 9 for regulating the shape of the spot 34*c* of the laser beam incident on the light emitting section 4. As shown in FIG. 13, the cylindrical lens 9 is shaped in a partial circular cylinder which has been formed in such a manner that a circular cylinder is cut out along its axis direction. The cylindrical lens 9 has a round surface 9*a* and a flat surface 9*b*. Causing a laser beam to be incident on the cylindrical lens 9 results in condensation or diffusion of the laser beam only in a single direction.

Figure 14:
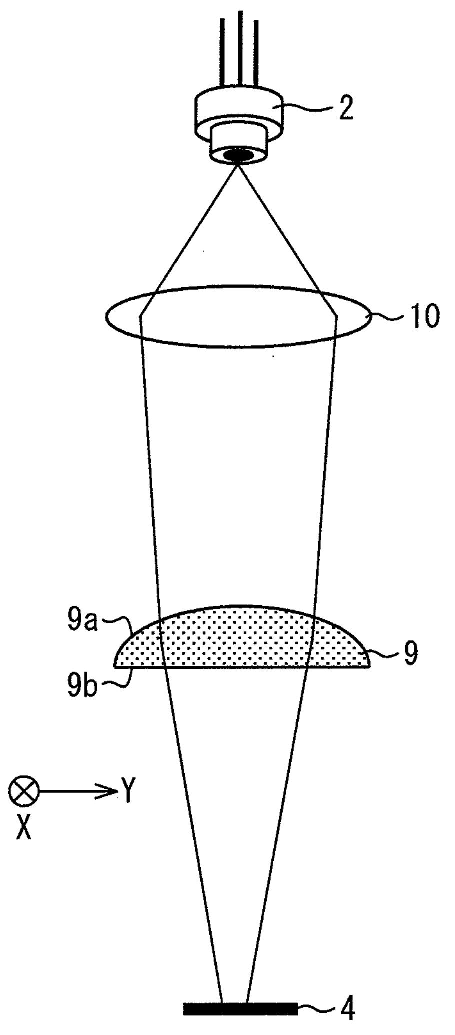
FIG. 14(*a*) is an explanatory view schematically illustrating a light condensing effect of the cylindrical lens shown in FIG. 13, and is a side view seen in an X-axis direction of FIG. 13.
Figure 14:
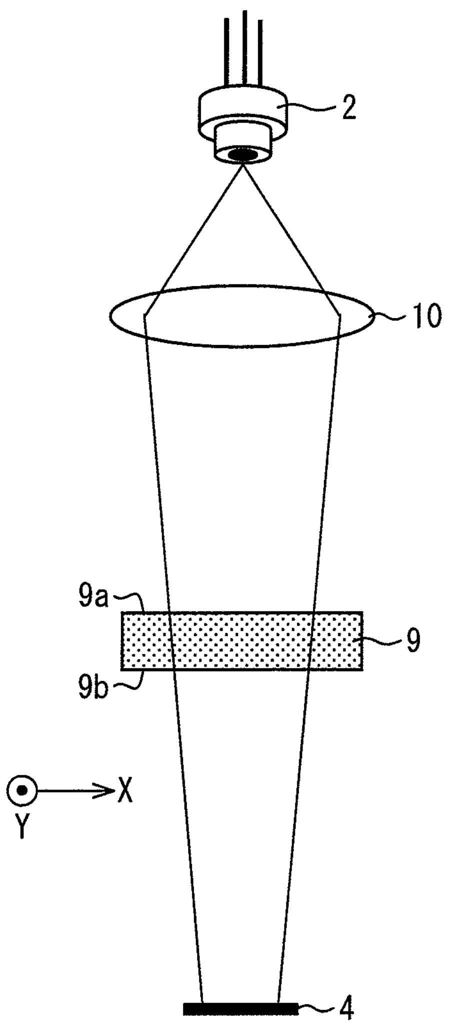

Each of FIGS. 14(*a*) and 14(*b*) is an explanatory view schematically illustrating a light condensing effect of the cylindrical lens 9 shown in FIG. 13. FIG. 14(*a*) is a side view seen in an X-axis direction of FIG. 13, whereas FIG. 14(*b*) is a top view seen in a Y-axis direction of FIG. 13. For example, as shown in FIGS. 14(*a*) and 14(*b*), disposing a convex lens 10 and the cylindrical lens 9 between the laser element 2 and the light emitting section 4 makes it possible to irradiate the light emitting section 4 with the laser beam which forms the elliptic spot 34*c* on the light emitting section 4.

Namely, in a case where a laser beam emitted from the laser element 2 is condensed by the convex lens 10 and is caused to enter the cylindrical lens 9 via the round surface 9*a*, the cylindrical lens 9 condenses, as shown in FIG. 14(*a*), the laser beam so that a width of the laser beam along a chord direction of the round surface 9*a* (i.e., along the Y-axis direction in FIG. 13) is reduced. On the other hand, as shown in FIG. 14(*b*), the cylindrical lens 9 does not condense the laser beam but transmits the laser beam as it is along a direction orthogonal to the chord direction (i.e., along the X-axis direction in FIG. 13).

Thus, causing the laser beam having been transmitted through the cylindrical lens 9 to be incident on the light emitting section 4 allows the laser beam to form the elliptic spot 34*c* on the light emitting section 4.

Note that, instead of the convex lens 10 and the cylindrical lens 9, an elliptic lens having at least one elliptic surface can be used.

Figure 15:
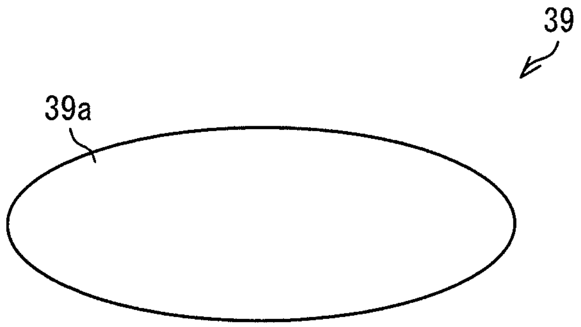
FIG. 15(*a*) is a top view of an elliptic lens.
Figure 15:
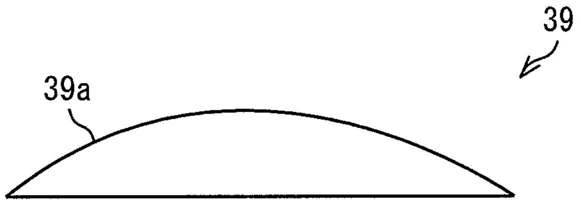

FIG. 15(*a*) is a top view of an elliptic lens 39, whereas FIG. 15(*b*) is a side view of the elliptic lens 39 shown in FIG. 15(*a*). For example, as shown in FIGS. 15(*a*) and 15(*b*), use of the elliptic lens 39 having an elliptic surface 39*a* makes it possible to form, only with the elliptic lens 39, a spot 34*c* of a laser beam which spot 34*c* is shaped in an ellipse having a long axis along the direction orthogonal to the light projection direction. Thus, the use of the elliptic lens 39 makes it possible to reduce the number of parts constituting the headlamp 1. This simplifies the structure of the headlamp 1, thereby reducing a manufacturing cost.

<Light Projection Property of Parabolic Mirror 5>

Figure 16:
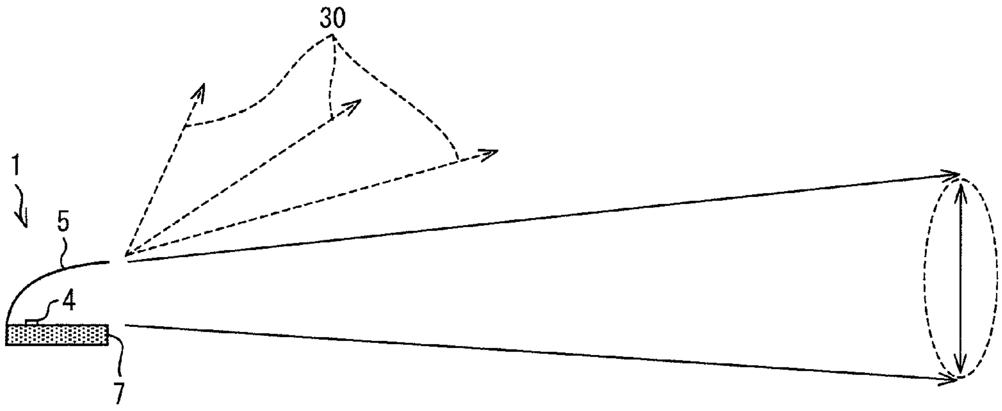
FIG. 16 is a view conceptually illustrating a light projection property of the parabolic mirror.

FIG. 16 is a view conceptually illustrating a light projection property of the parabolic mirror 5. The inventors of the present invention reached the following finding. As shown in FIG. 16, in a case where the headlamp 1 is positioned so that the metallic base 7 is located on a lower side in a vertical direction, most of the fluorescence that cannot be controlled by the parabolic mirror 5 (indicated by the sign 30) is emitted upwardly above the parabolic mirror 5, and such the fluorescence is hardly emitted downwardly.

Figure 17:
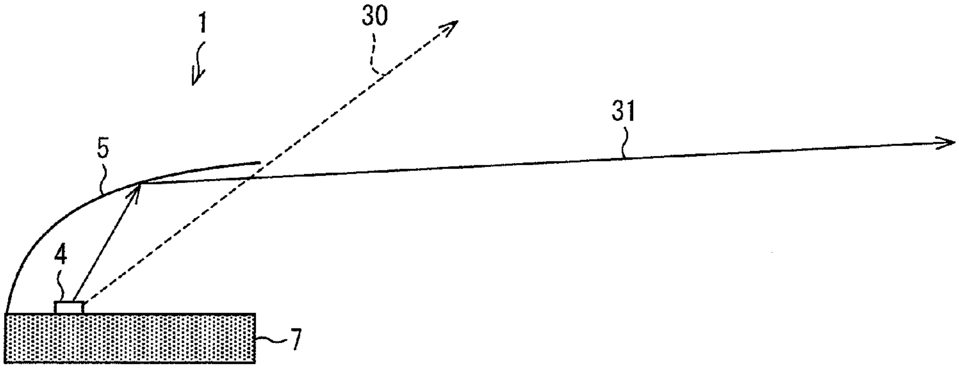
FIG. 17 is an explanatory view illustrating a principle of the light projection property of the parabolic mirror.

FIG. 17 is an explanatory view illustrating a principle of the light projection property of the parabolic mirror 5. As illustrated in FIG. 17, the fluorescence emitted via the upper surface 4*a* of the light emitting section 4 (indicated by the sign 31) is reflected by the parabolic mirror 5, and then is emitted forward within a narrow solid angle.

On the other hand, a part of the fluorescence emitted via the side surface of the light emitting section 4 (indicated by the sign 30) is not incident on the parabolic mirror 5, but travels obliquely upward at an angle out of the predetermined solid angle. Further, the fluorescence emitted from the side surface of the light emitting section 4 in parallel with the surface of the metallic base 7 travels forward as parallel light. Accordingly, the fluorescence that cannot be controlled by the parabolic mirror 5 is hardly emitted downwardly below the headlamp 1. By taking advantage of this light projection property, it is possible to irradiate, with the fluorescence that cannot be controlled by the parabolic mirror 5, a space on a side on which the parabolic mirror 5 of the headlamp 1 is provided.

<Mounting of Headlamp 1>

Figure 18:
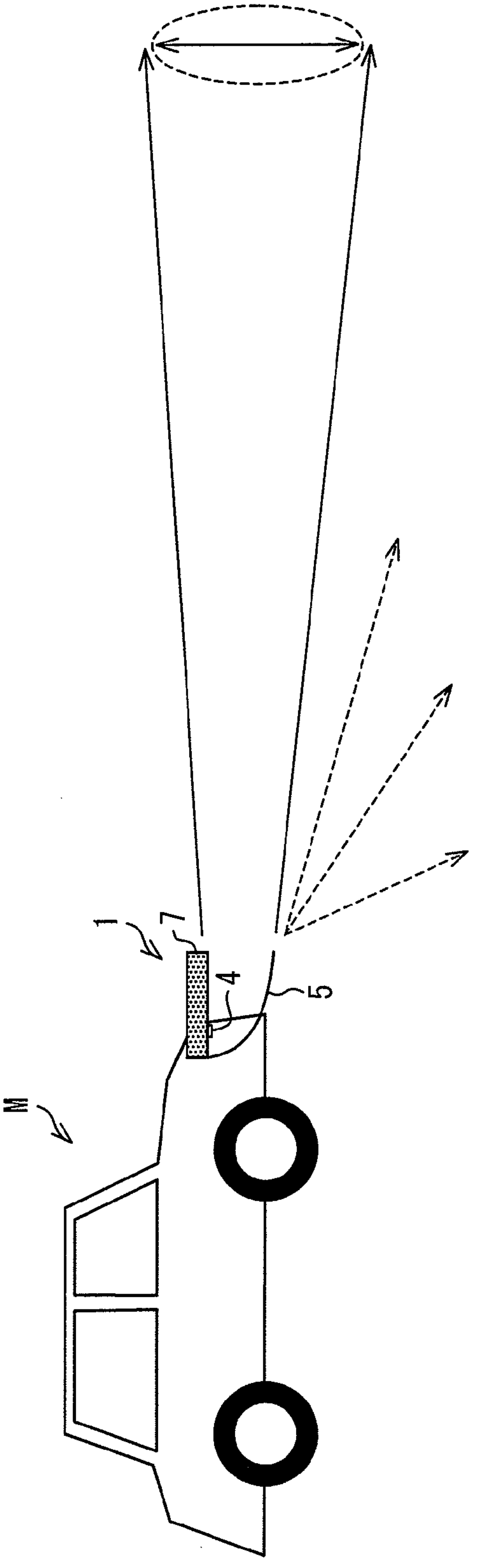
FIG. 18 is a view conceptually illustrating an orientation of a headlamp mounted in an automobile.

FIG. 18 is a view conceptually illustrating an orientation of the headlamp 1 mounted as a headlamp of an automobile (vehicle) M. As shown in FIG. 18, the headlamp 1 is preferably attached to a head of the automobile M so that the parabolic mirror 5 is positioned on a lower side in a vertical direction. By mounting the headlamp 1 in the automobile M in this manner, the automobile M can emit light having sufficient brightness in its front direction and also can emit light in its forward-downward direction, thanks to the above-described light projection property of the parabolic mirror 5.

Note that the headlamp 1 can be employed as a driving headlamp (high-beam headlamp) of a vehicle or a passing headlamp (low-beam headlamp) of a vehicle.

APPLICATION EXAMPLES OF PRESENT INVENTION

A light emitting device of the present invention is applicable not only to a vehicle headlamp but also to other illumination devices. For example, an illumination device of the present invention can be a downlight. The downlight is an illumination device attached to a ceiling of a structure such as a house or a vehicle. Instead, the illumination device of the present invention can be achieved as a headlamp for a moving object (e.g., a human, a ship, an airplane, a submersible, or a rocket) other than a vehicle. Further, the illumination device of the present invention can be achieved as a searchlight, a projector, or an interior illumination device (such as a stand light) other than the downlight.

EXAMPLES

The following description deals with concrete examples of the present invention with reference to FIGS. 19 through 33. Note that members which are identical with members described in the foregoing embodiments have the same signs as those of the members described in the foregoing embodiments, and explanations of these are omitted here for the sake of simple explanation. Further, materials, shapes, and various values described below are merely examples, and the present invention is not limited to these.

Example 1

Figure 19:
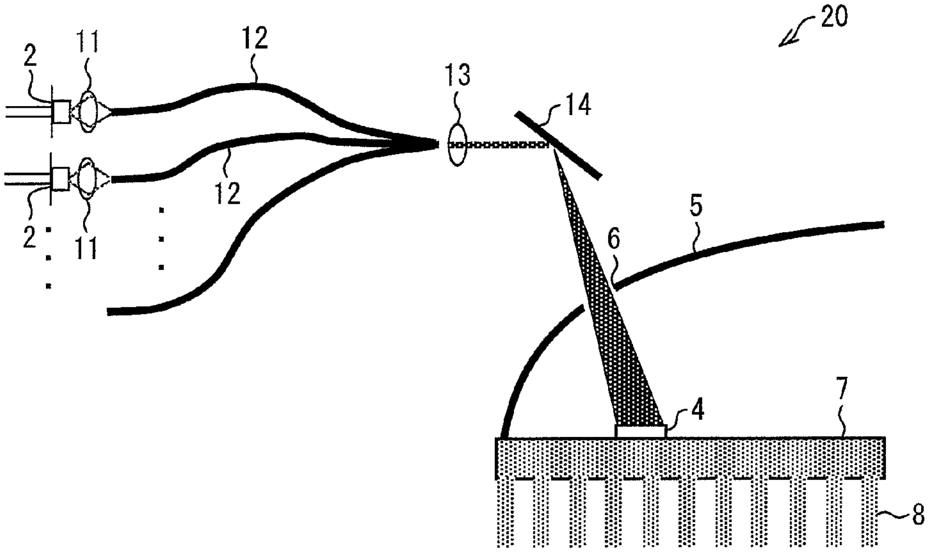
FIG. 19 is a view schematically illustrating a configuration of a headlamp in accordance with an example of the present invention.

FIG. 19 is a view schematically illustrating a headlamp 20 in accordance with an example of the present invention. As shown in FIG. 19, the headlamp 20 includes a plurality of sets each including a laser element 2 and a condenser lens 11, a plurality of optical fibers (light-guiding members) 12, a lens 13, a reflecting mirror 14, a light emitting section 4, a parabolic mirror 5, a metallic base 7, and fins 8.

Each of the condenser lenses 11 is a lens for causing a laser beam emitted from a corresponding one of the laser elements 2 to be incident on an incident end section of a corresponding one of the optical fibers 12, which incident end section is one of ends of the corresponding one of the optical fibers 12. The plurality of sets each including the laser element 2 and the condenser lens 11 are provided for the plurality of optical fibers 12, respectively. Namely, the laser elements 2 are optically coupled with the optical fibers 12, respectively, via the respective plurality of condenser lens 11.

Each of the plurality of optical fibers 12 is a light-guiding member for guiding, to the light emitting section 4, a laser beam emitted from a corresponding one of the laser elements 2. The optical fiber 12 has a two-layer structure in which a center core is coated with a clad having a lower refractive index than that of the center core. The laser beam incident on the incident end section travels though the optical fiber 12, and then exits from an output end section, which is the other one of the ends of the optical fiber 12. The output end sections of the plurality of optical fibers 12 are bounded up with a ferrule or the like.

The laser beams emitted from the exit end sections of the respective plurality of optical fibers 12 are enlarged by the lens 13 so that the entire light emitting section 4, having an upper surface whose diameter is 2 mm, is irradiated with the laser beams. The enlarged laser beams are reflected by the reflecting mirror 14, so that an optical path of the laser beams is changed. Consequently, the laser beams are led to the light emitting section 4 through the window section 6 of the parabolic mirror 5.

(Details of Laser Element 2)

Each of the laser elements 2 emits a laser beam having a wavelength of 405 nm and has an output of 1 W. The headlamp 20 includes eight laser elements 2 in total. Accordingly, a total output of these laser elements 2 is 8 W.

(Details of Light Emitting Section 4)

The light emitting section 4 contains a mixture of three kinds of fluorescent materials, i.e., RGB fluorescent materials, so as to emit white light. The red fluorescent material is $CaAlSiN_3$:Eu, the green fluorescent material is β-SiAlON:Eu, and the blue fluorescent material is $(BaSr)MgAl_{10}O_{17}$:Eu. Powders of these fluorescent materials are sintered into a solid.

The light emitting section 4 is shaped in, for example, a disc (circular cylinder) having a diameter of 2 mm and a thickness of 0.2 mm.

(Details of Parabolic Mirror 5)

The parabolic mirror 5 has an opening section **5*b* shaped in a half circle whose radius is 30 mm. The parabolic mirror 5 has a depth of 30 mm. The light emitting section 4 is provided at a focal point of the parabolic mirror 5**.

(Details of Metallic Base 7)

The metallic base 7 is made from copper, and aluminum is vapor-deposited on a surface of the metallic base 7 on which surface the light emitting section 4 is to be provided. On a surface of the metallic base 7 opposite to the surface on which aluminum is vapor-deposited, the fins 8 each having a length of 30 mm and a width of 1 mm are provided at intervals of 5 mm. Note that the metallic base 7 and the fins 8 can be formed integral with each other.

(Effects of Headlamp 20)

According to the headlamp 20, the light emitting section 4 has a small thickness, and the upper surface of the light emitting section 4 faces a reflecting curved surface of the parabolic mirror 5. Therefore, it is possible to control, by the parabolic mirror 5, most of the fluorescence emitted from the light emitting section 4. This can reduce an amount of the fluorescence that cannot be controlled by the parabolic mirror 5, thereby increasing use efficiency of the fluorescence.

Example 2

Figure 20:
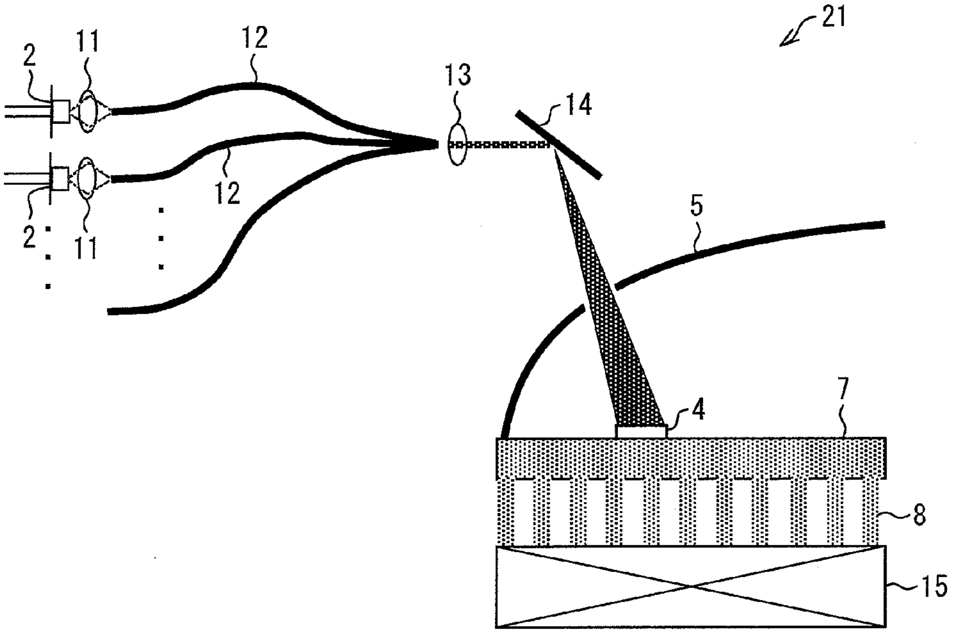
FIG. 20 is a view schematically illustrating a configuration of a headlamp in accordance with an example of the present invention.

FIG. 20 is a view schematically illustrating a headlamp 21 in accordance with an example of the present invention. As shown in FIG. 20, the headlamp 21 includes a plurality of sets each including a laser element 2 and a condenser lens 11, a plurality of optical fibers 12, a lens 13, a reflecting mirror 14, a light emitting section 4, a parabolic mirror 5, a metallic base 7, fins 8, and a fan (cooling section) 15.

A major difference between Examples 1 and 2 is that Example 2 includes the fan 15, which is provided below the fins 8. The fan 15 sends air to the metallic base 7 and the fins 8. This increases a heat dissipation effect achieved by the metallic base 7 and the fins 8. The metallic base 7 and the fins 8 of Example 2 are identical to those used in Example 1.

(Details of Laser Element 2)

Each of the laser elements 2 emits a laser beam having a wavelength of 450 nm and has an output of 1 W. The headlamp 21 includes six laser elements 2 in total. Accordingly, a total output of these laser elements 2 is 6 W.

(Details of Light Emitting Section 4)

The light emitting section 4 contains one kind of fluorescent material which emits yellow light. The fluorescent material is, for example, $(Y_{1-x-y}Gd_xCe_y)_3Al_5O_{12}$ ($0.1 \leq x \leq 0.55$, $0.01 \leq y \leq 0.4$). Powder of such the yellow fluorescent material is mixed with a resin, and the resulting mixture is applied to the metallic base 7.

The light emitting section 4 is shaped in, for example, a disc having a diameter of 2 mm and a thickness of 0.1 mm.

(Details of Parabolic Mirror 5)

The parabolic mirror 5 has an opening section **5*b* shaped in a half circle whose radius is 25 mm. The parabolic mirror 5 has a depth of 45 mm. The light emitting section 4 is provided at a focal point of the parabolic mirror 5**.

Example 3

Figure 21:
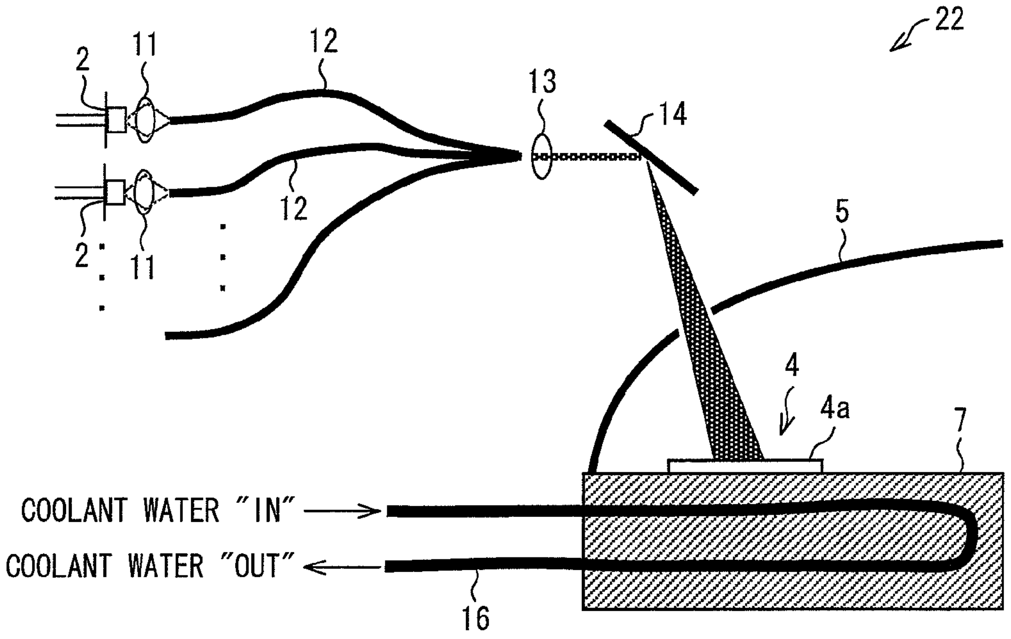
FIG. 21 is a view schematically illustrating a configuration of a headlamp in accordance with an example of the present invention.

FIG. 21 is a view schematically illustrating a headlamp 22 in accordance with an example of the present invention. As shown in FIG. 21, the headlamp 22 includes a plurality of sets each including a laser element 2 and a condenser lens 11, a plurality of optical fibers 12, a lens 13, a reflecting mirror 14, a light emitting section 4, a parabolic mirror 5, a metallic base 7, and a water-cooling pipe (cooling section) 16.

(Details of Light Emitting Section 4)

A major difference between Examples 1 and 3 is that, in Example 3, the light emitting section 4 has an upper surface **4*a* (laser beam irradiated surface) whose area is larger than that of the spot of the laser beam. The light emitting section 4 is shaped in a disc having a diameter of 10 mm and a thickness of 0.1 mm. Powders of three kinds of fluorescent materials, which are the same as those used in Example 1, are uniformly mixed with a resin, and the resulting mixture is applied to the metallic base 7. The laser beams are incident on the light emitting section 4 as a circular spot having a diameter of 2 mm. The circular spot of the laser beams is incident on a position of the light emitting section 4 which position substantially coincides with (i) a focal point of the parabolic mirror 5 and (ii) a center of the upper surface 4*a* of the light emitting section 4**.

As described above, the upper surface **4*a* of the light emitting section 4 has a larger area than that of the spot of the laser beams. Consequently, the fluorescence would hardly exit from a side surface of the light emitting section 4. It is therefore possible to reduce an amount of the fluorescence that cannot be controlled by the parabolic mirror 5** and to increase use efficiency of the fluorescence.

(Details of Metallic Base 7)

Another major difference between Examples 1 and 3 is that, in Example 3, the water-cooling pipe 16 is provided inside the metallic base 7. Coolant water flows through the water-cooling pipe 16. Circulating the coolant water through the water-cooling pipe 16 cools the metallic base 7. This makes it possible to increase heat dissipation efficiency of the metallic base 7 with respect to the light emitting section 4. Note that the metallic base 7 of Example 3 is the same as that of Example 1 in terms of that the metallic base 7 is made from copper, and aluminum is vapor-deposited on a surface of the metallic base 7 on which surface the light emitting section 4 is to be provided.

(Details of Parabolic Mirror 5)

The parabolic mirror 5 has an opening section 5*b* shaped in a half circle whose radius is 30 mm. The parabolic mirror 5 has a depth of 30 mm. The light emitting section 4 is provided at a focal point of the parabolic mirror 5.

Example 4

Figure 22:
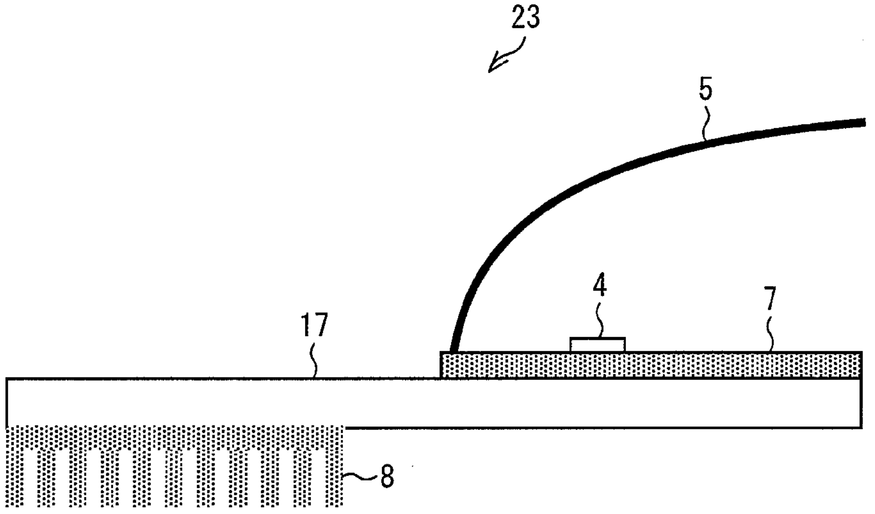
FIG. 22 is a view schematically illustrating a configuration of a headlamp in accordance with an example of the present invention.

FIG. 22 is a view schematically illustrating a headlamp 23 in accordance with an example of the present invention. The headlamp 23 includes a plurality of sets each including a laser element 2 and a condenser lens 11, a plurality of optical fibers 12, a lens 13, a reflecting mirror 14, a light emitting section 4, a parabolic mirror 5, a metallic base 7, fins 8, and a heat pipe (cooling section) 17. Note that the laser elements 2, the condenser lenses 11, the optical fibers 12, the lens 13, and the reflecting mirror 14 are not shown in FIG. 22.

The headlamp 23 is configured such that the heat pipe 17 is provided between the metallic base 7 and the fins 8. Thanks to the heat pipe 17 via which heat of the metallic base 7 is conducted to the fins 8, it is possible to dispose the fins 8 and the parabolic mirror 5 so as to be separated from each other. This makes it possible to enhance flexibility in designing a headlamp.

Example 5

Figure 23:
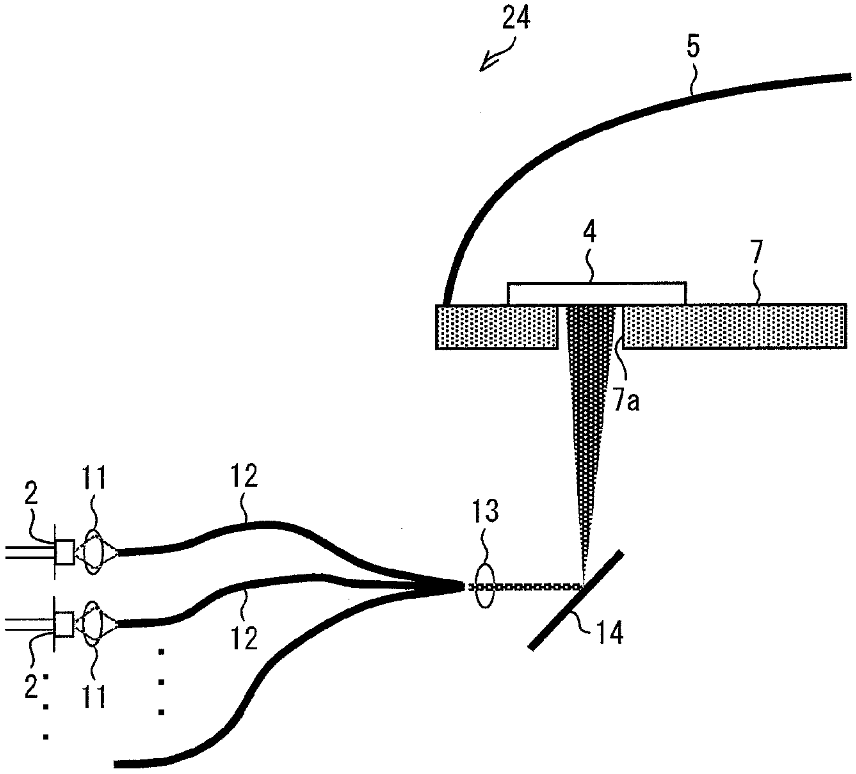
FIG. 23 is a view schematically illustrating a configuration of a headlamp in accordance with an example of the present invention.

FIG. 23 is a view schematically illustrating a headlamp 24 in accordance with an example of the present invention. As shown in FIG. 23, the headlamp 24 includes a plurality of sets each including a laser element 2 and a condenser lens 11, a plurality of optical fibers 12, a lens 13, a reflecting mirror 14, a light emitting section 4, a parabolic mirror 5, and a metallic base 7. The headlamp 24 employs a transmission-type light emission principle.

Major differences between Examples 1 and 5 are as follows: In Example 5, a laser beam is emitted via a bottom surface (i.e., a surface facing an upper surface 34*a* of the light emitting section 4) of the light emitting section 4 through an opening section 7*a* provided in the metallic base 7; Example 5 employs the transmission-type light emission principle according to which a laser beam is incident on the bottom surface of the light emitting section 4, so that fluorescence is emitted from the upper surface 34*a*, which faces the bottom surface.

The headlamp 24 includes the metallic base 7, which is provided with the opening section 7*a*. The laser beam is emitted so that the laser beam travels through the opening section 7*a* and then enters the light emitting section 4 via the bottom surface of the light emitting section 4.

This eliminates the need for providing a window section 6 in the parabolic mirror 5, thereby substantially increasing an area of a reflecting curved surface of the parabolic mirror 5. This makes it possible to increase an amount of fluorescence which is controllable.

Note that, as shown in FIG. 23, the light emitting section 4 may be larger than the opening section 7*a* of the metallic base 7 and may be provided so as to cover the opening section 7*a*. Alternatively, the light emitting section 4 may have almost the same size as that of the opening section 7*a* and may be fitted in the opening section 7*a*.

Example 6

Figure 24:
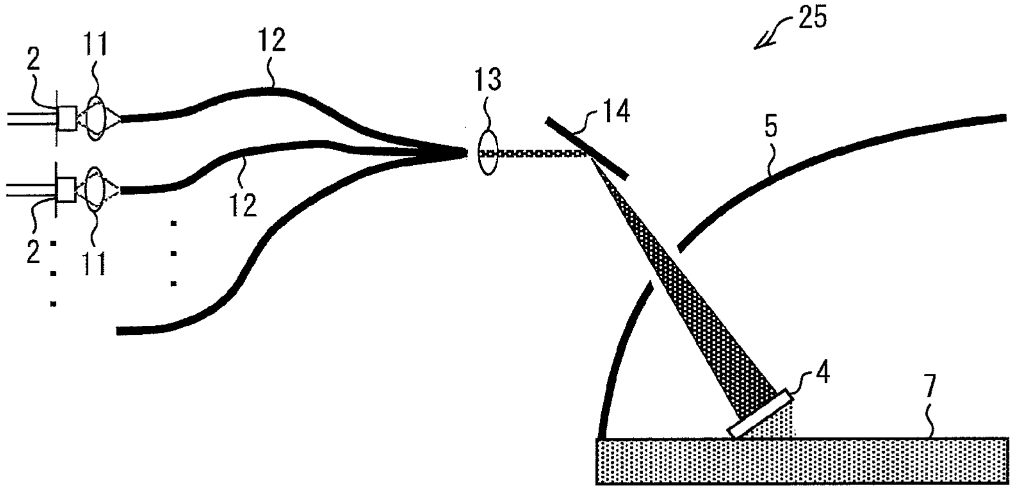
FIG. 24 is a view schematically illustrating a configuration of a headlamp in accordance with an example of the present invention.

FIG. 24 is a view schematically illustrating a headlamp 25 in accordance with an example of the present invention. As shown in FIG. 24, the headlamp 25 includes a plurality of sets each including a laser element 2 and a condenser lens 11, a plurality of optical fibers 12, a lens 13, a reflecting mirror 14, a light emitting section 4, a parabolic mirror 5, and a metallic base 7.

A major difference between Examples 1 and 6 is that, in Example 6, the light emitting section 4 has an upper surface (laser beam irradiated surface) inclined toward a part of the parabolic mirror 5 which part is opposite to an opening section 5*b* of the parabolic mirror 5. To be more specific, a perpendicular line extending from the upper surface of the light emitting section 4 is inclined toward the part of the parabolic mirror 5 which part is opposite to the opening section 5*b* of the parabolic mirror 5 at a greater angle than a perpendicular line extending from a surface of the metallic base 7 does. An angle of the inclination of the upper surface of the light emitting section 4 is 45°, for example.

Configuring the light emitting section 4 so as to be inclined in this manner increases a percentage of fluorescence controlled by the parabolic mirror 5, with respect to fluorescence emitted from a side surface of the light emitting section 4. Conversely, configuring the light emitting section 4 so as to be inclined in this manner reduces an amount of fluorescence which is not incident on the parabolic mirror 5 but is diffused to the outside. This makes it possible to increase use efficiency of the fluorescence.

Example 7

Figure 25:
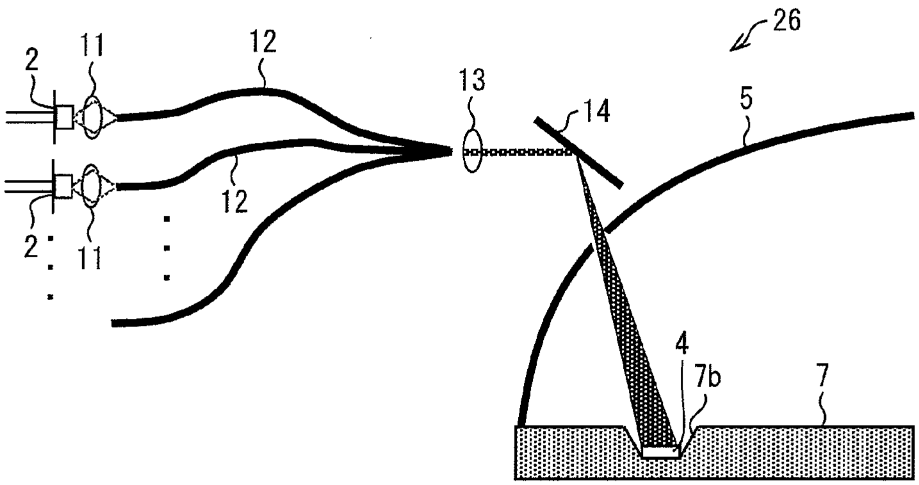
FIG. 25 is a view schematically illustrating a configuration of a headlamp in accordance with an example of the present invention.

FIG. 25 is a view schematically illustrating a headlamp 26 in accordance with an example of the present invention. As shown in FIG. 25, the headlamp 26 includes a plurality of sets each including a laser element 2 and a condenser lens 11, a plurality of optical fibers 12, a lens 13, a reflecting mirror 14, a light emitting section 4, a parabolic mirror 5, and a metallic base 7.

A major difference between Examples 1 and 7 is as follows: In Example 7, the metallic base 7 is provided with a recess 7*b*, and the light emitting section 4 is provided on a bottom of the recess 7*b*. In Example 7, as well as in Example 1, the metallic base 7 is made from copper, and aluminum is vapor-deposited on a surface of the metallic base 7 on which surface the light emitting section 4 is to be provided.

The recess 7*b* has an inclined side surface, and aluminum is vapor-deposited also on the inclined side surface. Therefore, the inclined side surface can reflect the fluorescence emitted from the light emitting section 4. An angle of the inclination of the inclined side surface is 45°, for example.

The fluorescence emitted from a side surface of the light emitting section 4 is reflected by the inclined side surface of the recess 7*b* and is led to the parabolic mirror 5, so as to be controlled by the parabolic mirror 5. This can reduce an amount of fluorescence emitted from the side surface of the light emitting section 4 and cannot be controlled by the parabolic mirror 5, thereby making it possible to increase use efficiency of the fluorescence.

Example 8

Figure 26:
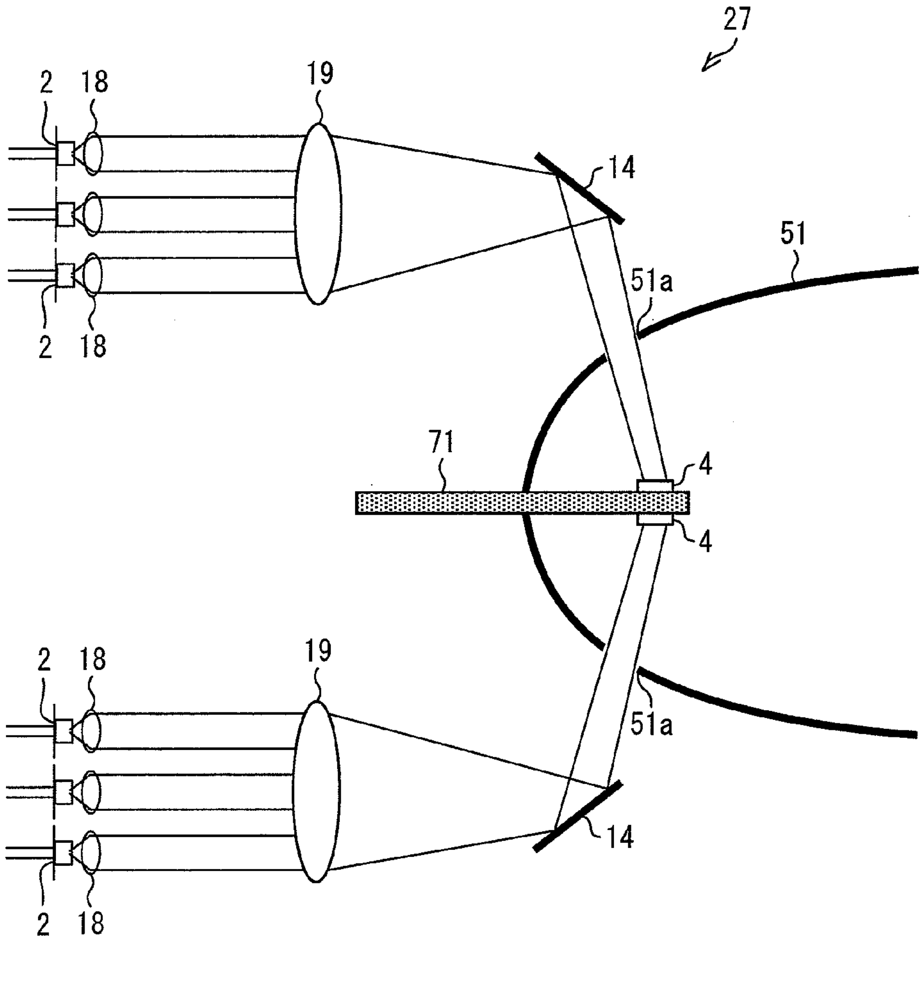
FIG. 26 is a view schematically illustrating a configuration of a headlamp in accordance with an example of the present invention.

FIG. 26 is a view schematically illustrating a headlamp 27 in accordance with an example of the present invention. As shown in FIG. 26, the headlamp 27 includes a plurality of sets each including a laser element 2 and a lens 18, condenser lenses 19, reflecting mirrors 14, light emitting sections 4, a parabolic mirror (reflecting mirror) 51, and a metal plate (heat conductive member, supporting member) 71.

The parabolic mirror 51 includes, as a reflecting mirror, a paraboloid of revolution. Further, the parabolic mirror 51 has an opening section shaped in a closed ring. Namely, the parabolic mirror 51 includes, as its reflecting surface, at least a part of a curved surface formed by rotating a parabola around a rotational axis which is a symmetric axis of the parabola.

The metal plate 71 is a silver-plated copper plate. The metal plate 71 is provided so as to penetrate through a part of the parabolic mirror 51 which part is in the vicinity of the vertex of the parabolic mirror 51 and to extend to the inside of the parabolic mirror 51. The light emitting sections 4 are provided on both of top and back surfaces of the metallic plate 71. Laser beams are incident on the respective light emitting sections 4 provided on the top and back surfaces of the metallic plate 71. Each of the light emitting sections 4 is positioned substantially at a focal point of the parabolic mirror 51.

Specifically, laser beams emitted from the laser elements 2 are formed into parallel light by the respective lenses 18, and then reduced by the corresponding condenser lens 19 to a size which suits an upper surface of the corresponding light emitting section 4. Thereafter, the laser beams are reflected by the corresponding reflecting mirror 14, and are incident on the corresponding light emitting section 4 through a corresponding window section 51*a* of the parabolic mirror 51.

Two sets each including the laser elements 2, the lenses 18, the condenser lens 19, and the reflecting mirror 14 are provided so that laser beams are incident on the two light emitting sections 4, respectively. Further, the parabolic mirror 51 have two window sections provided for the above two sets, respectively. Each of the two window sections is similar to the window section 6.

The metallic plate 71 supports the light emitting sections 4, and has a function to dissipate heat of the light emitting sections 4. Anything can be used instead of the metallic plate 71, as long as it has a similar function. For example, instead of the metallic plate 71, a heat pipe can be used. With such a configuration, it is possible to efficiently transfer heat of the light emitting sections 4 to the outside of the parabolic mirror 51.

Further, a heat exchange mechanism for heat radiation, for example, fins, may be provided in an end of the metallic plate 71 or the heat pipe in which end no light emitting section 4 is provided.

(Details of Laser Element 2)

Each of the laser elements 2 emits a laser beam having a wavelength of 405 nm and has an output of 1 W. The headlamp 27 includes six laser elements 2 in total. Accordingly, a total output of these laser elements 2 is 6 W.

(Details of Parabolic Mirror 51)

The parabolic mirror 51 has, on its anterior side, an opening section shaped in a circle whose radius is 30 mm. The parabolic mirror 51 has a depth of 40 mm. The light emitting section 4 is provided at a focal point of the parabolic mirror 5.

Note that a composition and a shape of the light emitting section 4 of Example 4 are the same as those of Example 1.

Example 9

Figure 27:
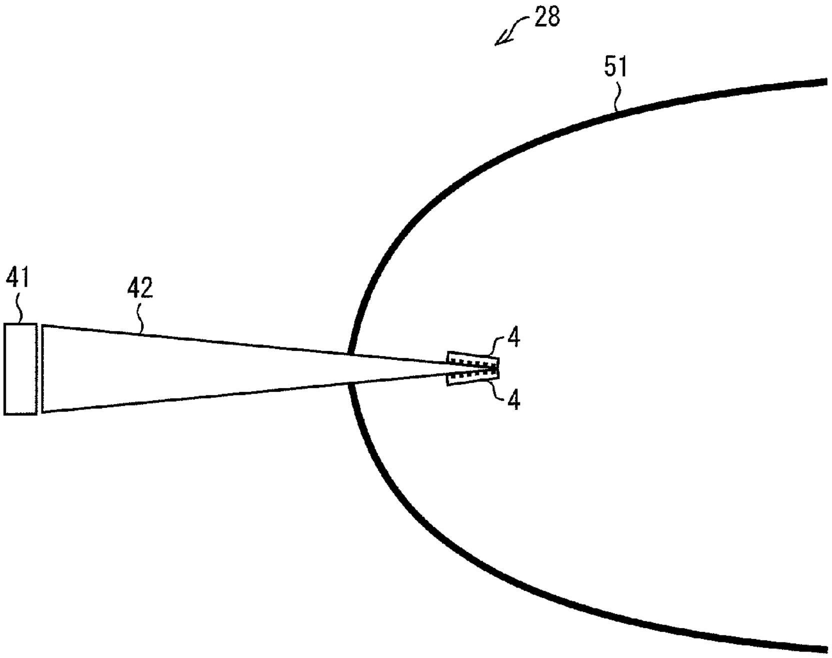
FIG. 27 is a view schematically illustrating a configuration of a headlamp in accordance with an example of the present invention.
Figure 28:
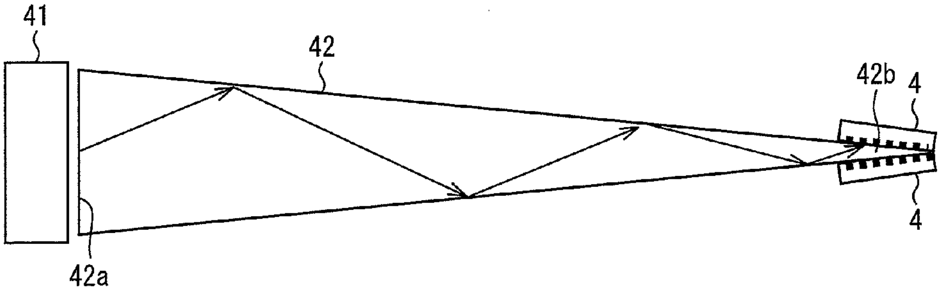
FIG. 28 is an enlarged view of an array laser, a light-guiding section, and a light emitting section.

FIG. 27 is a view schematically illustrating a headlamp 28 in accordance with an example of the present invention. FIG. 28 is an enlarged view of an array laser 41, a light-guiding section 42, and light emitting sections 4. As shown in FIGS. 27 and 28, the headlamp 28 includes the array laser (excitation light source) 41, the light-guiding section 42, the light emitting sections 4, and a parabolic mirror 51.

The array laser 41 includes a plurality of laser elements. Each of the plurality of laser elements emits a laser beam. As a laser beam source having a similar function, a multi-emitter laser array made of a plurality of LD chips mounted on a single substrate may be used. The array laser 41 has a total output of 8 W.

The light-guiding section 42 is a light-guiding member, shaped in a pyramid or a prismoid, for converging a plurality of laser beams emitted from the array laser 41 and guiding the laser beams to the light emitting section 4. The light-guiding section 42 is made from, e.g., quartz ($SiO_2$). The laser beams entering the light-guiding section 42 are subjected to total reflection by internal side surfaces of the light-guiding section 42.

As shown in FIG. 28, the laser beams emitted from the array laser 41 enter the light-guiding section 42 via an incident surface 42*a* of the light-guiding section 42, which incident surface 42*a* is one of ends of the light-guiding section 42. The laser beams having entered the light-guiding section 42 are guided through the light-guiding section 42 while being subjected to total reflection in the light-guiding section 42, so as to exit from an exit end 42*b* of the light-guiding section 42, which exit end 42*b* is the other of the ends of the light-guiding section 42. The exit end 42*b* has a roughened, ground glass-like surface. Accordingly, the laser beams are not subjected to total reflection in the exit end 42*b*, but leak to the outside therefrom.

The exit end 42*b* has a cross-sectional area smaller than an area of the incident surface 42*a* (namely, the light-guiding section 42 is tapered). Therefore, the laser beams having entered the light-guiding section 42 are converged while traveling toward the exit surface 42*b*.

The light emitting sections 4 are provided in the vicinity of the exit end 42*b* of the light-guiding section 42. Specifically, two (a plurality of) light emitting sections 4 are provided so that the exit end 42*b* is sandwiched by the two light emitting sections 4. This allows the fluorescence to be emitted in two directions, i.e., in upper and lower directions in FIG. 27. Further, each of the two light emitting sections 4 has a small thickness. Therefore, it is possible to reduce an amount of the fluorescence that cannot be controlled by the parabolic mirror 51.

Alternatively, a single light emitting section 4 may be provided so as to be in contact with a side surface of the exit end 42*b*. Further alternatively, a single light emitting section 4 may be provided at the tip of the exit end 42*b*.

(Details of Light Emitting Section 4)

The light emitting section 4 is shaped in a rectangular solid having (i) an upper surface shaped in a square, 2 mm on a side, and (ii) a thickness of 0.2 mm. A composition of the light emitting section 4 is the same as that of Example 1. Namely, powders of fluorescent materials are sintered into a solid.

(Details of Parabolic Mirror 51)

The parabolic mirror 51 has, on its anterior side, an opening section shaped in a circle whose radius is 50 mm. The parabolic mirror 51 has a depth of 50 mm. Each of the two light emitting sections 4 is provided at a focal point of the parabolic mirror 5.

Example 10

Figure 29:
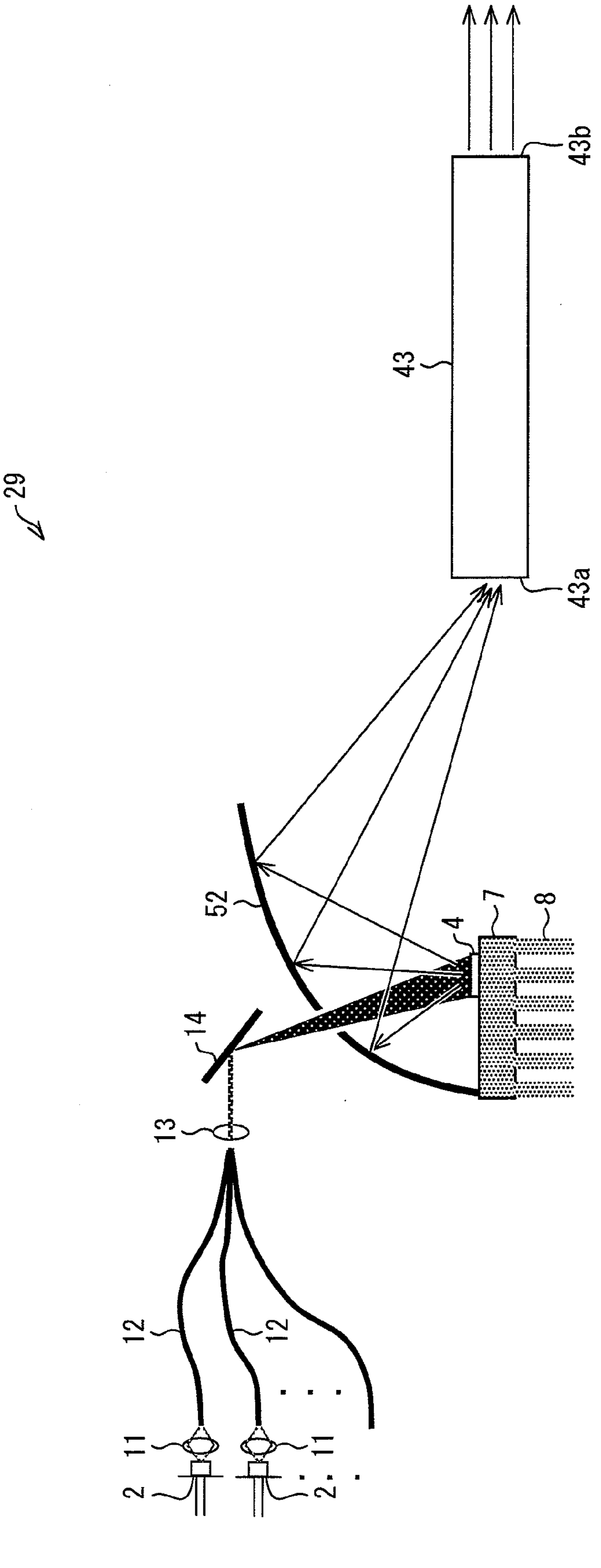
FIG. 29 is a view schematically illustrating an illumination device in accordance with an example of the present invention.

FIG. 29 is a view schematically illustrating a light source 29 provided in a projector or the like in accordance with an example of the present invention. As shown in FIG. 29, the light source 29 includes a plurality of sets each including a laser element 2 and a condenser lens 11, a plurality of optical fibers 12, a lens 13, a reflecting mirror 14, a light emitting section 4, an elliptic mirror (reflecting mirror) 52, a metallic base 7, fins 8, and a rod lens 43.

A major difference between Examples 1 and 10 is that the light source 29 includes, instead of the parabolic mirror, the elliptic mirror (a mirror having an elliptic surface) as the reflecting mirror. The light emitting section 4 is provided at a first focal point of the elliptic mirror 52. The fluorescence reflected by the elliptic mirror 52 is incident on an incident surface 43*a*, which is provided at one of ends of the rod lens 43. Then, the fluorescence is guided through the rod lens 43, and exits from an exit surface 43*a*, which is provided at the other of ends of the rod lens 43. The exit surface 43*a* is provided at a second focal point of the elliptic mirror 52.

The rod lens 43 functions as an optical indirector. The rod lens 43 mixes together angular components of the pencils of beams, so as to reduce non-uniformity in illumination intensity, color heterogeneity, and generation of flickering. The rod lens 43 may be shaped in a circular cylinder or a rectangular column. The shape of the rod lens 43 can be determined in accordance with a desired shape of a spot of the illumination light.

Such the configuration employing the rod lens 43 is suitable for a light source in an illumination system for a projector.

Example 11

Figure 30:
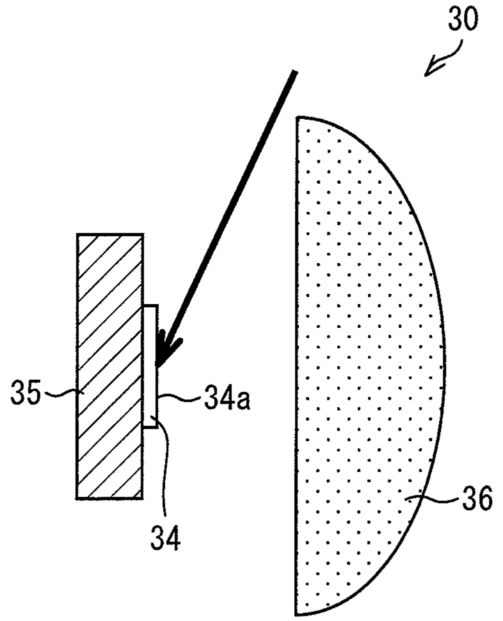
FIG. 30 is a view schematically illustrating a main part of an illumination device in accordance with an example of the present invention.
Figure 31:
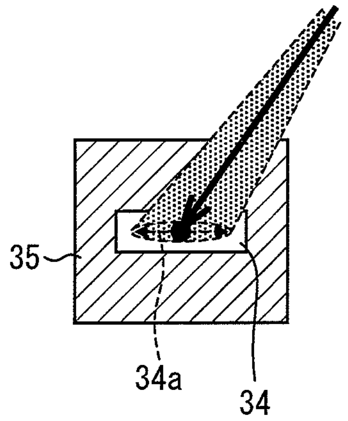
FIG. 31 is an enlarged plan view of the surrounding of a light emitting section shown in FIG. 30.

FIG. 30 is a view schematically illustrating a main part of a light source 30 in accordance with an example of the present invention. FIG. 31 is an enlarged plan view of the surrounding of a light emitting section 34 shown in FIG. 30. As shown in FIG. 30, the light source 30 includes the light emitting section 34, a heat sink (heat conductive member, supporting member) 35, and a projector lens (light projecting section) 36.

Major differences between Examples 1 and 11 are as follows: In Example 11, the projector lens 36 is used as the light projecting member instead of the parabolic mirror 5, and the light emitting section 34 is shaped so as to have a long axis.

The heat sink 35 supports the light emitting section 34, and has a function to dissipate, via a surface of the heat sink 35 which surface is in contact with the light emitting section 34, heat generated in the light emitting section 34 due to the laser beam emitted onto the light emitting section 34. For this purpose, the heat sink 35 is preferably made from a metal material through which heat is easily conducted, e.g., aluminum or copper. However, the material of the heat sink 35 is not particularly limited, and only needs to have high heat conductivity.

The surface of the heat sink 35 which surface is in contact with the light emitting section 34 has been subjected to a reflection treatment, and therefore functions as a reflecting surface. This allows the laser beam having entered the light emitting section 34 via an upper surface (main light emitting surface) 34*a* to be reflected by the reflecting surface, so that the laser beam is led to the inside of the light emitting section 34 again.

The projector lens 36 is the light projecting member for projecting, along a predetermined light projection direction, the fluorescence generated by the light emitting section 34. Namely, the projector lens 36 is an optical system which transmits and deflects the fluorescence, in order to project the fluorescence along the predetermined light projection direction.

As described above, the light source 30 includes no parabolic mirror 5 but includes the projector lens 36, which is provided so as to face the upper surface 34*a* of the light emitting section 34 provided on the heat sink 35.

As shown in FIG. 31, the light source 30 includes the light emitting section 34 shaped to have a long axis extending along a direction orthogonal to a light projection direction of the projector lens 36. Further, the light emitting section 34 has the upper surface 34*a* shaped in a rectangle. Furthermore, a laser beam is incident on the upper surface 34*a* in such a manner that an elliptic spot 34*c* is formed on the upper surface 34*a*.

As described above, in place of the parabolic mirror 5, the light source 30 includes the projector lens 36 as the light projecting member. With this configuration, it is possible to provide a small headlamp.

Further, the light source 30 includes the light emitting section 34 which is shaped to have the long axis according to the shape of the spot 34*c* of the laser beam incident on the light emitting section 34. This allows the light source 30 to suitably emit the laser beam which forms the elliptic spot 34*c*. Namely, the light source 30 can suitably emit illumination light whose spot has a vertical to horizontal ratio satisfying the light distribution property standards.

Example 12

Figure 32:
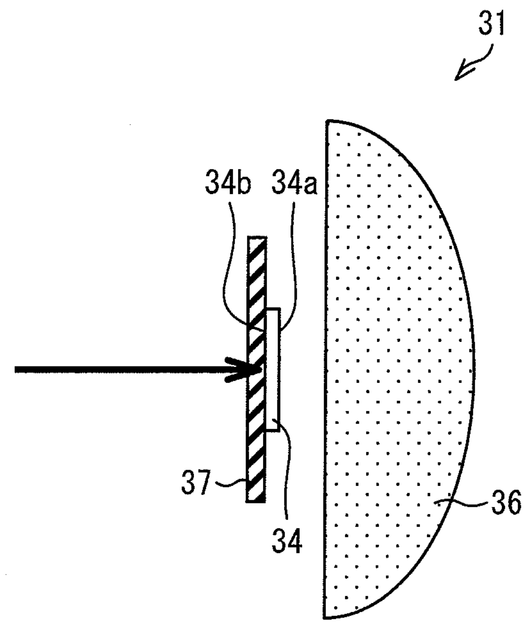
FIG. 32 is a view schematically illustrating a main part of an illumination device in accordance with an example of the present invention.

FIG. 32 is a view schematically illustrating a main part of a light source 31 in accordance with an example of the present invention. As shown in FIG. 32, the light source 31 includes a light emitting section 34, a transparent plate 37, and a projector lens 36.

A major difference between Examples 11 and 12 is as follows: In Example 11, the light source 30 employs a reflection-type light emission principle. According to the reflection-type light emission principle, a laser beam is incident on the upper surface 34*a* of the light emitting section 34, and the upper surface 34*a*, on which the laser beam is incident, emits fluorescence. On the other hand, in the present example, the light source 31 employs the transmission-type light emission principle. According to the transmission-type light emission principle, a laser beam is incident on a bottom surface 34*b* of the light emitting section 34, and an upper surface 34*a* of the light emitting section 34, which upper surface 34*a* faces the bottom surface 34*b*, emits fluorescence.

In the light source 31, the light emitting section 34 is provided on the transparent plate (supporting member) 37 which is made from, e.g., glass. Further, a laser beam is incident on the bottom surface 34*b* of the light emitting section 34 via the transparent plate 37. The light emitting section 34 transmits the laser beam having entered thereinto via the bottom surface 34*b*, which is in contact with the transparent plate 37. Then, the light emitting section 34 emits fluorescence via the upper surface 34*a*, which faces the bottom surface 34*b*, toward the projector lens 36.

As described above, the present invention is applicable both to (i) the light source 30, which employs the reflection-type light emission principle, and (ii) the light source 31, which employs the transmission-type light emission principle. In either case, it is possible to increase use efficiency of the fluorescence.

Further, in the light source 31, the light emitting section 34 is supported by the transparent plate 37. Therefore, although the light source 31 employs the transmission-type light emission principle, the transparent plate 37 needs not to be provided with an opening section for transmitting a laser beam. This makes it possible to omit a process for providing such an opening section in the transparent plate 37.

Example 13

Figure 33:
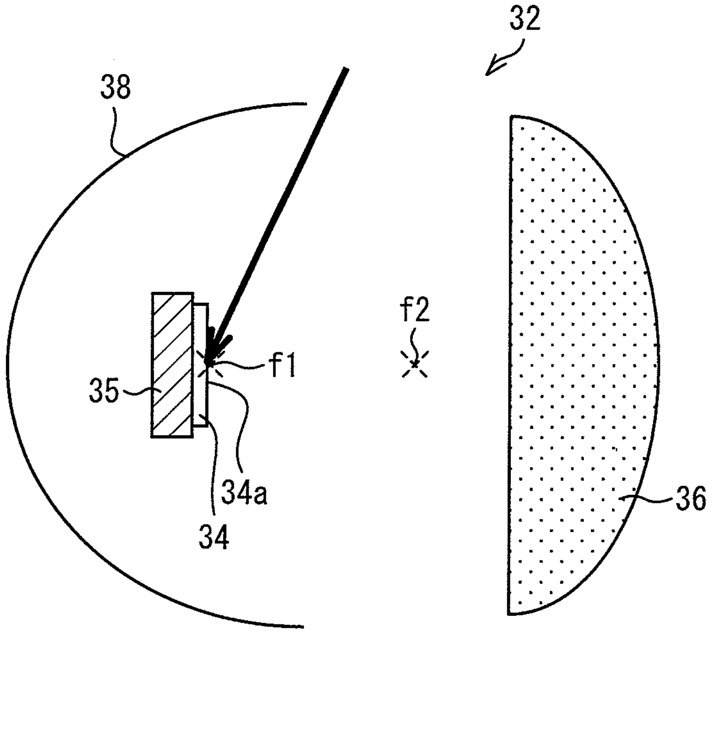
FIG. 33 is a view schematically illustrating a main part of an illumination device in accordance with an example of the present invention.

FIG. 33 is a view schematically illustrating a main part of a light source 32 in accordance with an example of the present invention. As shown in FIG. 33, the light source 32 includes a light emitting section 34, an elliptic mirror (light projecting section) 38, and a projector lens 36.

A major difference between Examples 11 and 13 is as follows: In Example 13, the elliptic mirror 38 is provided in addition to the projector lens 36, for the purpose of accurately projecting fluorescence emitted from the light emitting section 34.

The elliptic mirror 38 has a first focal point f1 and a second focal point f2. The light emitting section 34 is provided on the heat sink 35 so that a center of the light emitting section 34 is located at the first focal point f1.

According to the light source 32, fluorescence emitted from the light emitting section 34, which is provided at the first focal point f1, is reflected by the elliptic mirror 38, and the fluorescence is led toward the second focal point f2. Thereafter, the fluorescence passes through the second focal point f2, and then is projected through the projector lens 36 within a predetermined angle range.

The use of both the projector lens 36 and the elliptic mirror 38 as described above makes it possible to accurately project the fluorescence emitted from the light emitting section 34.

The present invention is not limited to the description of the embodiments above, but may be altered by a skilled person within the scope of the claims. An embodiment based on a proper combination of technical means disclosed in different embodiments is encompassed in the technical scope of the present invention.

SUMMARY OF EMBODIMENT

As described previously, a light emitting device in accordance with an embodiment of the present invention includes: an excitation light source for emitting excitation light; a light emitting section for emitting fluorescence upon receiving the excitation light emitted from the excitation light source; and a light projecting section for projecting, along a predetermined light projection direction, the fluorescence emitted by the light emitting section, a part of the light projecting section being provided so as to face a main light emitting surface of the light emitting section, the main light emitting surface having a larger area than that of a side surface of the light emitting section, and the light emitting section emitting the fluorescence in such a manner that distribution of the fluorescence corresponds to Lambertian distribution.

According to the above configuration, the light emitting section generates fluorescence upon receiving excitation light emitted from the excitation light source, and the light projecting section projects the fluorescence along the predetermined light projection direction, so that the fluorescence is emitted from the light emitting device as illumination light.

Here, the main light emitting surface of the light emitting section faces a part of the light projecting section. Note that the main light emitting surface has a larger area than that of the side surface of the light emitting section, and most of the fluorescence is emitted via the main light emitting surface. Therefore, it is possible to increase a percentage of fluorescence whose traveling path is controllable by the light projecting section, with respect to the fluorescence emitted from the light emitting section.

Even with this configuration, it is highly possible that (i) a traveling path of fluorescence emitted from the side surface of the fluorescent material (laterally-emitted fluorescence) cannot be controlled by the light projecting section and (ii) such fluorescence might be emitted in a direction other than the predetermined light projection direction.

However, according to the above configuration, the light emitting section emits the fluorescence in such a manner that distribution of the fluorescence corresponds to the Lambertian distribution, and therefore an amount of the laterally-emitted fluorescence is reduced. This has been confirmed by the inventors of the present invention.

Therefore, according to the above configuration, it is possible to reduce an amount of fluorescence that cannot be controlled by the light projecting section, thereby increasing use efficiency of fluorescence.

A light emitting device in accordance with an embodiment of the present invention includes: an excitation light source for emitting excitation light; a light emitting section for emitting fluorescence upon receiving the excitation light emitted from the excitation light source; and a light projecting section for projecting, along a predetermined light projection direction, the fluorescence emitted by the light emitting section, a part of the light projecting section being provided so as to face a main light emitting surface of the light emitting section, the main light emitting surface having a larger area than that of a side surface of the light emitting section, and the light emitting section having a small thickness, or a spot of the excitation light incident on a surface of the light emitting section having a smaller area than that of the surface.

According to the above configuration, the light emitting section emits fluorescence upon receiving excitation light emitted from the excitation light source, and the light projecting section projects the fluorescence along the predetermined light projection direction, so that the fluorescence is emitted from the light emitting device as illumination light.

Here, the main light emitting surface of the light emitting section faces a part of the light projecting section. Note that the main light emitting surface has a larger area than that of the side surface of the light emitting section, and most of the fluorescence is emitted via the main light emitting surface. Therefore, it is possible to increase a percentage of fluorescence whose traveling path is controllable by the light projecting section, with respect to the fluorescence emitted from the light emitting section.

Even with this configuration, it is highly possible that (i) a traveling path of fluorescence emitted from the side surface of the fluorescent material (laterally-emitted fluorescence) cannot be controlled by the light projecting section and (ii) such fluorescence might be emitted in a direction other than the predetermined light projection direction.

However, according to the above configuration, the light emitting section has a small thickness or the surface of the light emitting section which surface receives the excitation light has a larger area than an area of a spot of the excitation light. Therefore, an amount of the laterally-emitted fluorescence is reduced. This has been confirmed by the inventors of the present invention.

Therefore, according to the above configuration, it is possible to reduce an amount of fluorescence that cannot be controlled by the light projecting section, thereby increasing use efficiency of fluorescence.

Note that the description that "the light emitting section has a small thickness" herein means a shape of such a light emitting section that a side surface has a sufficiently smaller area than that of an upper surface and therefore most of the fluorescence is emitted upwardly.

Further, it is preferable that the light emitting section has a thickness which is not more than one-tenth of a maximum width among widths of the light emitting section which widths are along a direction perpendicular to a thickness direction of the light emitting section.

According to the above configuration, the thickness of the light emitting section is set to be not more than the above thickness. This eliminates the laterally-emitted fluorescence almost completely, thereby making it possible to further increase use efficiency of the fluorescence.

Further, it is preferable that the light projecting section includes a reflecting mirror for reflecting the fluorescence emitted by the light emitting section so as to project the fluorescence along the predetermined light projection direction.

According to the above configuration, it is possible to provide a suitable light projecting section for reflecting the fluorescence generated by the light emitting section so as to control a traveling path of the fluorescence.

Further, it is preferable that the main light emitting surface is inclined toward a part of the reflecting mirror which part is opposite to an opening section of the reflecting mirror.

According to the above configuration, the light emitting section is disposed such that the main light emitting surface, via which most of the fluorescence is emitted, is inclined toward the part of the reflecting mirror which part is opposite to the opening section of the reflecting mirror. This increases a percentage of the fluorescence incident on the reflecting mirror, with respect to the fluorescence emitted from the light emitting section, thereby making it possible to more reliably reduce the percentage of the fluorescence that cannot be controlled by the reflecting mirror.

Further, it is preferable that the excitation light source is provided outside the reflecting mirror; and the reflecting mirror is provided with a window section through which the excitation light is transmitted or passed.

According to the above configuration, it is possible to emit the excitation light from the outside of the reflecting mirror onto the light emitting section through the window section provided in the reflecting mirror. This makes it possible to enhance flexibility in positioning of the excitation light source. For example, this makes it easier to set, to a suitable angle, an incident angle of the excitation light with respect to the irradiated surface (on which the excitation light is incident) of the light emitting section.

Note that the window section may be an opening section or the one including a transparent member which can transmit the excitation light.

Further, it is preferable that the reflecting mirror has a reflecting surface including at least a part of a curved surface formed by rotating a parabola around a rotational axis which is a symmetric axis of the parabola.

Configuring the reflecting mirror so that at least a part thereof is a paraboloidal surface (parabola) makes it possible to efficiently project, into a narrow solid angle, the fluorescence generated by the light emitting section. This makes it possible to increase use efficiency of the fluorescence.

Further, it is preferable that the reflecting mirror includes, as the reflecting surface, at least a part of a partial curved surface obtained by cutting the curved surface along a plane including the rotational axis.

According to the above configuration, the reflecting mirror includes the reflecting curved surface obtained by cutting the parabola along the plane including the rotational axis. Therefore, it is possible to provide, in a part corresponding to a remaining half of the parabola, a structure other than the parabola. For example, providing, as the structure, a plate having high heat conductivity and positioning the light emitting section so that the light emitting section is in contact with the structure makes it possible to efficiently cool the light emitting section.

Furthermore, according to the above configuration, most of the fluorescence that cannot be controlled by the reflecting mirror is emitted toward the parabola. By taking advantage of this property, it is possible to irradiate a wide range of the parabola of the light emitting device with the fluorescence.

Further, it is preferable that the reflecting mirror has a reflecting surface including at least a part of a curved surface formed by rotating a figure around a rotational axis; and the reflecting mirror has a depth substantially equal to a radius of a circle or a half circle which is a shape of an opening section of the reflecting mirror.

According to the above configuration, the reflecting mirror has the depth substantially equal to the radius of the opening section. This allows the light emitting device to emit illumination light forming a spot in which illuminances of (i) a center part and (ii) a part surrounding the center part are balanced.

Further, it is preferable that the light projecting section includes a projector lens which transmits the fluorescence emitted by the light emitting section so as to project the fluorescence along the predetermined light projection direction.

According to the above configuration, it is possible to provide a suitable light projecting section for deflecting the fluorescence generated by the light emitting section so as to control a traveling path of the fluorescence.

Further, it is preferable that a spot of the excitation light incident on a surface of the light emitting section has a long axis along a direction orthogonal to the predetermined light projection direction.

According to the above configuration, the spot of the excitation light incident on the surface of the light emitting section has the long axis along the direction orthogonal to the light projection direction. This allows the light emitting device to emit illumination light spreading in the direction orthogonal to the light projection direction.

Therefore, according to the above configuration, it is possible to form a spot of illumination light which spot spreads relatively in the direction orthogonal to the light projection direction.

Further, it is preferable that the spot of the excitation light has (i) a first width, which is a maximum width among widths of the spot along its long axis direction, and (ii) a second width, which is a maximum width among widths of the spot along its short axis direction being orthogonal to the long axis direction, the first width being three or more times greater than the second width.

According to the above configuration, the shape of the spot of the excitation light is regulated so as to have (i) the first width, which is a maximum width among widths of the spot along its long axis direction, and (ii) the second width, which is a maximum width among widths of the spot along its short axis direction being orthogonal to the long axis direction, the first width being three or more times greater than the second width. This allows the light emitting device to emit illumination light spreading to a three or more times greater width in the direction orthogonal to the light projection direction. Therefore, for example, by making the long axis direction of the spot of the excitation light coincide with the horizontal direction, it is possible to form a spot of illumination which spot has a horizontal width three or more times greater than a vertical width.

Thus, according to the above configuration, it is possible to achieve suitable illumination light forming a spot having a vertical to horizontal ratio satisfying, e.g., the light distribution property standards for automobiles.

Further, it is preferable that the light emitting device further includes a convex lens for condensing the excitation light emitted from the excitation light source; and a plane-convex lens for causing the excitation light condensed by the convex lens to be incident on the surface of the light emitting section in such a manner that the excitation light forms, on the surface of the light emitting section, a spot having a long axis along the direction orthogonal to the predetermined light projection direction.

According to the above configuration, the light emitting device further includes (i) the convex lens for condensing the excitation light emitted from the excitation light source and (ii) the plane-convex lens for causing the excitation light condensed by the convex lens to be incident on the surface of the light emitting section in such a manner that the excitation light forms, on the surface of the light emitting section, the spot having the long axis along the direction orthogonal to the light projection direction. Thus, according to the above configuration, it is possible to suitably form the spot of the laser beam which spot has the long axis along the direction orthogonal to the light projection direction.

Therefore, according to the above configuration, it is possible to form a spot of illumination light which spot spreads relatively in the direction orthogonal to the light projection direction.

Further, it is preferable that the light emitting device further includes an elliptic lens for causing the excitation light emitted from the excitation light source to be incident on the surface of the light emitting section in such a manner that the excitation light forms, on the surface of the light emitting section, an elliptic spot having a long axis along the direction orthogonal to the predetermined light projection direction.

According to the above configuration, the light emitting device further includes the elliptic lens for causing the excitation light emitted from the excitation light source to be incident on the surface of the light emitting section in such a manner that the excitation light forms, on the surface of the light emitting section, the elliptic spot having the long axis along the direction orthogonal to the light projection direction. Thus, according to the above configuration, it is possible to form, only with the elliptic lens, the elliptic spot having the long axis along the direction orthogonal to the light projection direction.

Therefore, according to the above configuration, it is possible to reduce the number of parts constituting the light emitting device. This can reduce a manufacturing cost.

Further, it is preferable that the light emitting section is supported by a heat conductive member.

According to the above configuration, it is possible to efficiently dissipate heat of the light emitting section by the heat conductive member. This makes it possible to prevent a reduction in light emitting efficiency of the light emitting section which reduction is caused by heat of excitation light.

Further, it is preferable that the light emitting section is positioned on a bottom of a recess provided in the heat conductive member; and the recess has an inclined side surface for reflecting the fluorescence emitted from the light emitting section.

According to the above configuration, the fluorescence emitted from the side surface of the light emitting section is reflected by the inclined side surface of the recess, so as to be led toward the light projecting section. This makes it possible to further reduce an amount of the fluorescence that cannot be controlled by the light projecting section.

Further, it is preferable that the light emitting device further includes a cooling section for cooling the heat conductive member.

According to the above configuration, heat of the heat conductive member is released by the cooling section. This makes it possible to improve cooling efficiency of the heat conductive member with respect to the light emitting section. Note that the cooling section only needs to be capable of releasing heat of the heat conductive member to the outside. Examples of the cooling section encompass a heat-dissipating fin, an air-cooling mechanism, a water-cooling mechanism, and a heat pipe.

Further, it is preferable that the light emitting device further includes a supporting member for supporting the light emitting section, the supporting member being provided with an opening section, and the excitation light being incident on the light emitting section through the opening section.

According to the above configuration, the light emitting device further includes the supporting section, and the light emitting section is supported by the supporting section. The supporting section is provided with the opening section through which the excitation light is incident on the light emitting section.

Therefore, in a case where, for example, a reflecting mirror is used as the light projecting section, the reflecting mirror does not need to be provided with an opening section through which the excitation light is transmitted. This makes it possible to substantially increase an area of a reflecting surface of the reflecting mirror, thereby increasing an amount of the fluorescence which is controllable.

Further, an illumination device including the above light emitting device and a vehicle headlamp including the above light emitting device are also encompassed in the technical scope of the present invention.

A vehicle in accordance with an embodiment of the present invention includes a vehicle headlamp, the vehicle headlamp including: an excitation light source for emitting excitation light; a light emitting section for emitting fluorescence upon receiving the excitation light emitted from the excitation light source; a reflecting mirror having a reflecting curved surface for reflecting, toward a front of the vehicle, the fluorescence emitted by the light emitting section; and a supporting member having a surface (i) facing the reflecting curved surface and (ii) supporting the light emitting section, a part of the reflecting mirror being provided so as to face a main light emitting surface of the light emitting section, the main light emitting surface having a larger area than that of a side surface of the light emitting section, the light emitting section emitting the fluorescence in such a manner that distribution of the fluorescence corresponds to Lambertian distribution, and the vehicle headlamp being mounted in the vehicle so that the reflecting curved surface is located on a lower side in a vertical direction.

A vehicle in accordance with an embodiment of the present invention includes a vehicle headlamp, the vehicle headlamp including: an excitation light source for emitting excitation light; a light emitting section for emitting fluorescence upon receiving the excitation light emitted from the excitation light source; a reflecting mirror having a reflecting curved surface for reflecting, toward a front of the vehicle, the fluorescence emitted by the light emitting section; and a supporting member having a surface (i) facing the reflecting curved surface and (ii) supporting the light emitting section, a part of the reflecting mirror being provided so as to face a main light emitting surface of the light emitting section, the main light emitting surface having a larger area than that of a side surface of the light emitting section, the light emitting section having a small thickness, or a spot of the excitation light incident on a surface of the light emitting section having a smaller area than that of the surface, and the vehicle headlamp being mounted in the vehicle so that the reflecting curved surface is located on a lower side in a vertical direction.

In a state where the vehicle headlamp is mounted in the vehicle, a lower part (viewed in the vertical direction) of the vehicle headlamp corresponds to the reflecting mirror having the reflecting curved surface, and an upper part (viewed in the vertical direction) of the vehicle headlamp corresponds to the supporting member. Therefore, among the fluorescence emitted from the light emitting section, most of the fluorescence that cannot be controlled by the reflecting mirror is emitted toward the reflecting mirror of the vehicle headlamp, i.e., downwardly (viewed in the vertical direction). Consequently, it is possible to illuminate, with the light controlled by the reflecting mirror, a distant space (i.e., a space in front of the vehicle). Further, it is also possible to illuminate, with the fluorescence that cannot be controlled by the reflecting mirror, a space in the vicinity of the vehicle and a lower space.

Thus, according to the above configuration, it is possible to effectively use the fluorescence that cannot be controlled by the reflecting mirror and to enlarge an illumination range of the vehicle headlamp while brightly illuminating the space in front of the vehicle.

INDUSTRIAL APPLICABILITY

The present invention is applicable to light emitting devices and illumination devices, particularly to headlamps for automobiles. Further, with the present invention, these devices can increase use efficiency of fluorescence.

REFERENCE SIGNS LIST

1 Headlamp (light emitting device, vehicle headlamp)
2 Laser element (excitation light source)
4 Light emitting section
**4*a*** Upper surface (main light emitting surface)
**4*b*** Side surface
**4*c*** Spot
5 Parabolic mirror (light projecting section, reflecting mirror)
6 Window section
7 Metallic base (heat conductive member, supporting member)
**7*a*** Opening section
**7*b*** Recess
8 Fins (cooling section)
9 Cylindrical lens (plane-convex lens)
10 Convex lens
15 Fan (cooling section)
16 Water-cooling pipe (cooling section)
17 Heat pipe (cooling section)
20 Headlamp (light emitting device, vehicle headlamp)
21 Headlamp (light emitting device, vehicle headlamp)
22 Headlamp (light emitting device, vehicle headlamp)
23 Headlamp (light emitting device, vehicle headlamp)
24 Headlamp (light emitting device, vehicle headlamp)
25 Headlamp (light emitting device, vehicle headlamp)
26 Headlamp (light emitting device, vehicle headlamp)
27 Headlamp (light emitting device, vehicle headlamp)
28 Headlamp (light emitting device, vehicle headlamp)
29 Light source (light emitting device, illumination device)
30 Light source (light emitting device, illumination device)
31 Light source (light emitting device, illumination device)
32 Light source (light emitting device, illumination device)
**34*a*** Upper surface (main light emitting surface)
**34*c*** Elliptic spot
35 Heat sink (heat conductive member, supporting member)
36 Projector lens (light projecting section)
37 Transparent plate (supporting member)
38 Elliptic mirror (light projecting section)
39 Elliptic lens
41 Array laser (excitation light source)
51 Parabolic mirror (reflecting mirror)
**51*a*** Window section
52 Elliptic mirror (reflecting mirror)
71 Metallic plate (heat conductive member, supporting member)
M Automobile (vehicle)

The invention claimed is:

1. A light emitting device comprising:
an excitation light source for emitting excitation light;
a light emitting section for emitting fluorescence upon receiving the excitation light emitted from the excitation light source, the light emitting section having a top surface, a bottom surface and a side surface connecting the top surface and the bottom surface; and
a light projecting section for projecting, along a predetermined light projection direction, the fluorescence emitted by the light emitting section,
wherein a part of the light projecting section is provided so as to face the top surface of the light emitting section, the top surface having a larger area than that of the side surface of the light emitting section,
the top surface of the light emitting section is flat and configured to receive the excitation light and to emit the fluorescence,
the light emitting section has an maximum width in a direction parallel to the top surface, and
a thickness of the light emitting section, which is defined by a distance between the top surface and the bottom surface, is not more than one tenth of the maximum width of the light emitting section.

2. The light emitting device as set forth in claim 1, wherein:
the light projecting section includes a reflecting mirror for reflecting the fluorescence emitted by the light emitting section so as to project the fluorescence along the predetermined light projection direction.

3. The light emitting device as set forth in claim 2, wherein:
the top surface is inclined toward a part of the reflecting mirror which part is opposite to an opening section of the reflecting mirror.

4. The light emitting device as set forth in claim 2, wherein:
the excitation light source is provided outside the reflecting mirror; and
the reflecting mirror is provided with a window section through which the excitation light is transmitted or passed.

5. The light emitting device as set forth in claim 2, wherein:
the reflecting mirror has a reflecting surface including at least a part of a curved surface formed by rotating a parabola around a rotational axis which is a symmetric axis of the parabola.

6. The light emitting device as set forth in claim 5, wherein:
the reflecting mirror includes, as the reflecting surface, at least a part of a partial curved surface obtained by cutting the curved surface along a plane including the rotational axis.

7. The light emitting device as set forth in claim 2, wherein:
the reflecting mirror has a reflecting surface including at least a part of a curved surface formed by rotating a figure around a rotational axis; and the reflecting mirror has a depth substantially equal to a radius of a circle or a half circle which is a shape of an opening section of the reflecting mirror.

8. The light emitting device as set forth in claim 1, wherein:

the light projecting section includes a projector lens which transmits the fluorescence emitted by the light emitting section so as to project the fluorescence along the predetermined light projection direction.

9. The light emitting device as set forth in claim 1, wherein:

a spot of the excitation light incident on a surface of the light emitting section has a long axis along a direction orthogonal to the predetermined light projection direction.

10. The light emitting device as set forth in claim 9, wherein:

the spot of the excitation light has (i) a first width, which is a maximum width among widths of the spot along its long axis direction, and (ii) a second width, which is a maximum width among widths of the spot along its short axis direction being orthogonal to the long axis direction, the first width being three or more times greater than the second width.

11. The light emitting device as set forth in claim 9, further comprising:

a convex lens for condensing the excitation light emitted from the excitation light source; and a plane-convex lens for causing the excitation light condensed by the convex lens to be incident on the surface of the light emitting section in such a manner that the excitation light forms, on the surface of the light emitting section, a spot having a long axis along the direction orthogonal to the predetermined light projection direction.

12. The light emitting device as set forth in claim 9, further comprising:

an elliptic lens for causing the excitation light emitted from the excitation light source to be incident on the surface of the light emitting section in such a manner that the excitation light forms, on the surface of the light emitting section, an elliptic spot having a long axis along the direction orthogonal to the predetermined light projection direction.

13. The light emitting device as set forth in claim 1, wherein:

the light emitting section is supported by a heat conductive member.

14. The light emitting device as set forth in claim 13, wherein:

the light emitting section is positioned on a bottom of a recess provided in the heat conductive member; and the recess has an inclined side surface for reflecting the fluorescence emitted from the light emitting section.

15. The light emitting device as set forth in claim 1, further comprising:

a supporting member for supporting the light emitting section, the supporting member being provided with an opening section, and the excitation light being incident on the light emitting section through the opening section.

16. An illumination device comprising a light emitting device recited in claim 1.

17. A vehicle headlamp comprising a light emitting device recited in claim 1.

18. A light emitting device comprising:

an excitation light source for emitting excitation light;

a light emitting section for emitting fluorescence upon receiving the excitation light emitted from the excitation light source; and a light projecting section for projecting, along a predetermined light projection direction, the fluorescence emitted by the light emitting section, wherein a part of the light projecting section is provided so as to face a main light emitting surface of the light emitting section, the main light emitting surface having a larger area than that of a side surface of the light emitting section, the main light emitting surface is flat and configured to receive the excitation light, and a spot of the excitation light incident on the main light emitting surface has a smaller area than that of the main light emitting surface.

19. A vehicle comprising a vehicle headlamp, the vehicle headlamp including:

an excitation light source for emitting excitation light;

a light emitting section for emitting fluorescence upon receiving the excitation light emitted from the excitation light source, the light emitting section having a top surface, a bottom surface and a side surface connecting the top surface and the bottom surface;

a reflecting mirror having a reflecting curved surface for reflecting, toward a front of the vehicle, the fluorescence emitted by the light emitting section; and a supporting member having a surface facing the reflecting curved surface and supporting the light emitting section, wherein a part of the reflecting mirror is provided so as to face the top surface of the light emitting section, the top surface having a larger area than that of the side surface of the light emitting section, the top surface of the light emitting section is flat and configured to receive the excitation light and to emit the fluorescence, the light emitting section has an maximum width in a direction parallel to the top surface, and a thickness of the light emitting section, which is defined by a distance between the top surface and the bottom surface, is not more than one tenth of the maximum width of the light emitting section, and the vehicle headlamp being mounted in the vehicle so that the reflecting curved surface is located on a lower side in a vertical direction.

* * * * *